(12) United States Patent
Kawai et al.

(10) Patent No.: US 7,338,641 B2
(45) Date of Patent: Mar. 4, 2008

(54) FINE CHANNEL DEVICE, DESKSIZE CHEMICAL PLANT AND FINE PARTICLE PRODUCING APPARATUS EMPLOYING THEM

(75) Inventors: Akira Kawai, Sagamihara (JP); Koji Katayama, Yamato (JP); Toru Futami, Yokohama (JP); Shinichi Matsumoto, Kamakura (JP); Tomohiro Ohkawa, Sagamihara (JP); Tomoyuki Oikawa, Zama (JP); Katsuyuki Hara, Chigasaki (JP)

(73) Assignee: Tosoh Corporation, Shunan-shi (JP)

( * ) Notice: Subject to any disclaimer, the term of this patent is extended or adjusted under 35 U.S.C. 154(b) by 749 days.

(21) Appl. No.: 10/630,847

(22) Filed: Jul. 31, 2003

(65) Prior Publication Data

US 2004/0022690 A1     Feb. 5, 2004

(30) Foreign Application Priority Data

Aug. 1, 2002  (JP)  ............................ 2002-225104
Dec. 17, 2002  (JP)  ............................ 2002-365666

(51) Int. Cl.
*B01L 3/02*   (2006.01)
*B01L 11/00*  (2006.01)
*B32B 5/02*   (2006.01)
*B32B 27/04*  (2006.01)
*B32B 27/12*  (2006.01)

(52) U.S. Cl. .................... 422/100; 422/50; 422/68.1; 422/101; 422/129; 436/43; 436/174; 436/177; 436/180

(58) Field of Classification Search ................. 422/50, 422/68.1, 100, 101; 436/43, 174, 177, 180
See application file for complete search history.

(56) References Cited

U.S. PATENT DOCUMENTS 6,167,910 B1   1/2001  Chow
6,582,662 B1*  6/2003  Kellogg et al. ............... 422/72
6,706,519 B1*  3/2004  Kellogg et al. ............ 435/287.2

(Continued)

FOREIGN PATENT DOCUMENTS

EP    1 123 734 A2   8/2001
EP    1 250 954 A2   10/2002
WO    WO 99/64836    12/1999

OTHER PUBLICATIONS

H. Hisamoto, et al, Chem. Commun., pp. 2662-2663, "Fast and High Conversion Phase-Transfer Synthesis Exploiting the Liquid-Liquid Interface Formed in a Microchannel Chip", 2001.

(Continued)

*Primary Examiner*—Brian Sines
(74) *Attorney, Agent, or Firm*—Oblon, Spivak, McClelland, Maier & Neustadt, P.C.

(57) ABSTRACT

A fine channel device for performing a chemical treatment or for producing fine particles, capable of supplying a liquid to the fine channels evenly and producing products in a large quantity is provided. The fine channel device includes a storage space having a circular or polygonal recess for temporarily storing fluid, and supply channels formed in a radial direction from the storage space. A small chemical plant includes a plurality of the fine channel devices as fundamental constituents and a mechanism to supply at least one fluid and a mechanism to recover products produced.

22 Claims, 13 Drawing Sheets

U.S. PATENT DOCUMENTS

| | | | |
|---|---|---|---|
| 6,719,682 B2* | 4/2004 | Kellogg et al. | 494/84 |
| 6,791,677 B2* | 9/2004 | Kawai et al. | 356/73 |
| 2002/0074271 A1 | 6/2002 | Hu et al. | |
| 2002/0092973 A1 | 7/2002 | Nagle et al. | |
| 2002/0097633 A1 | 7/2002 | O'Connor et al. | |
| 2003/0219713 A1* | 11/2003 | Valencia et al. | 435/4 |
| 2006/0159592 A1* | 7/2006 | Andersson et al. | 422/100 |

OTHER PUBLICATIONS

T. Nishisako, et al., 4th Chemical and Microsystem Research Conference Text, p. 59, "Producing of Fine Droplet in Liquid by Employing a Microchannel", 2001.

Kikutani, et al., 3rd Chemical and Microsystem Research Conference Text, p. 9, "Synthetizing in High Productivity Microchannels in a Pile-Up Microreactor", 2001.

* cited by examiner

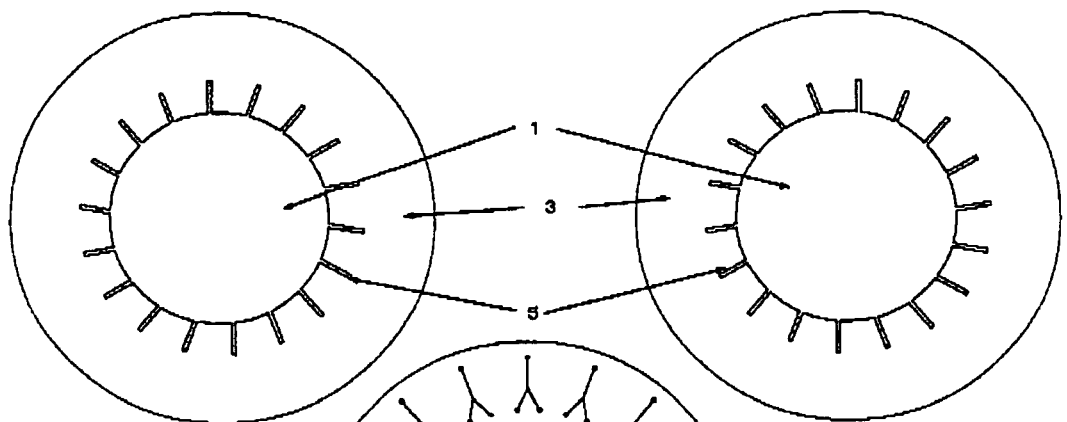
Fig. 1(a)   Fig. 1(c)
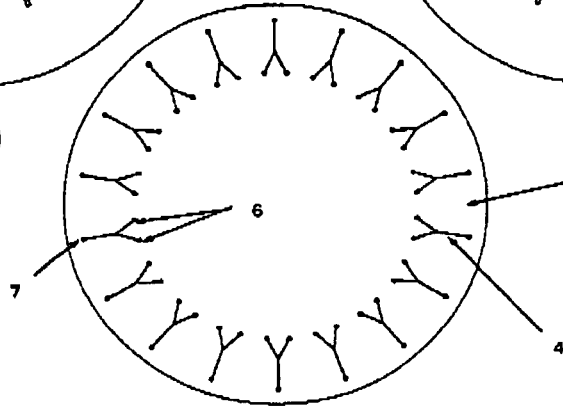
Fig. 1(b)
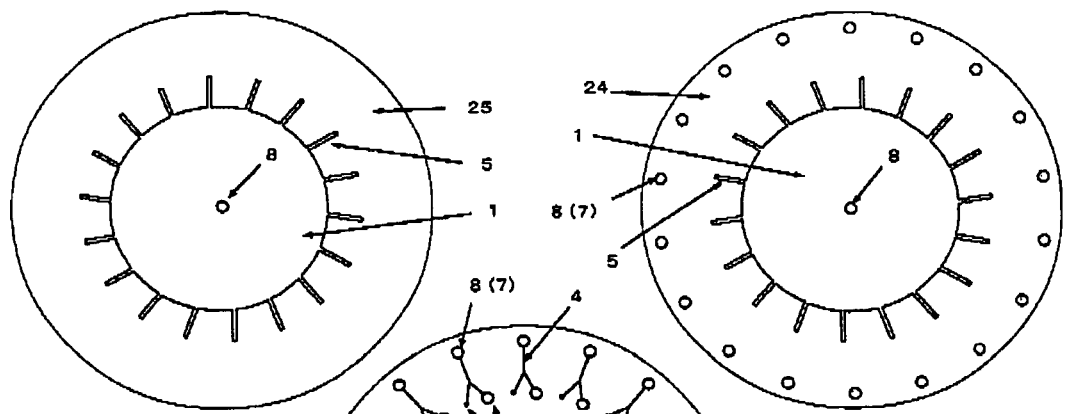
Fig. 2(a)   Fig. 2(c)
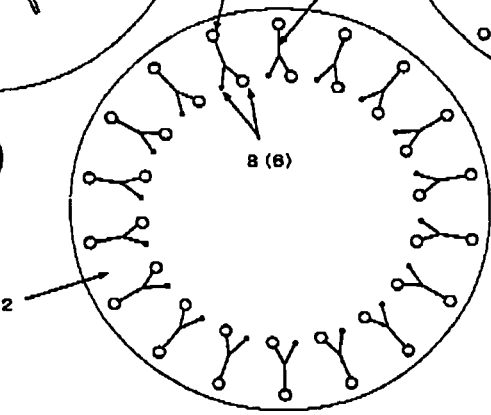
Fig. 2(b)

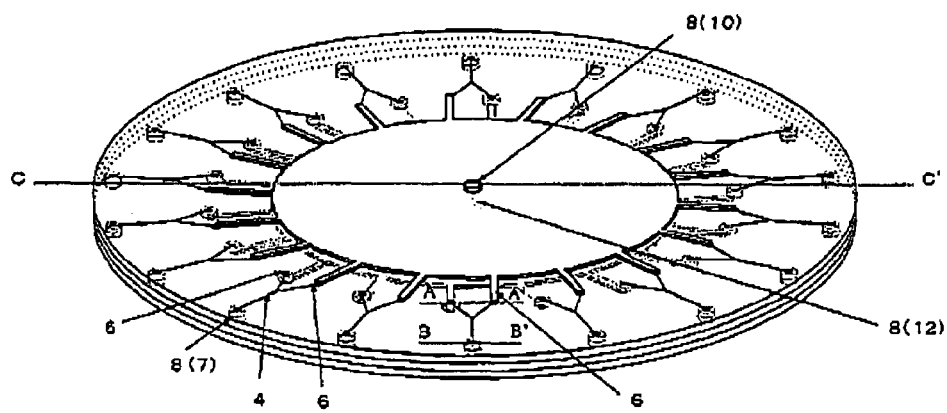
Fig. 5(a)
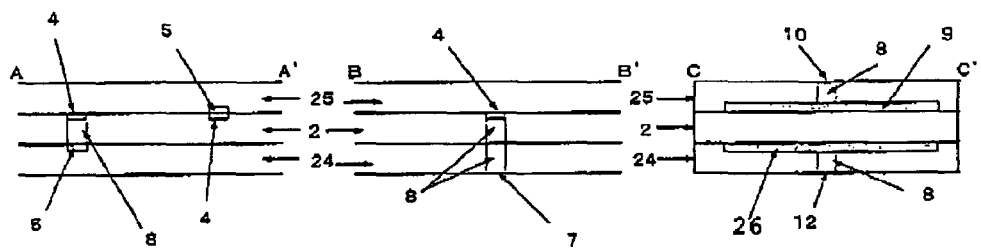
Fig. 5(b)  Fig. 5(c)  Fig. 5(d)
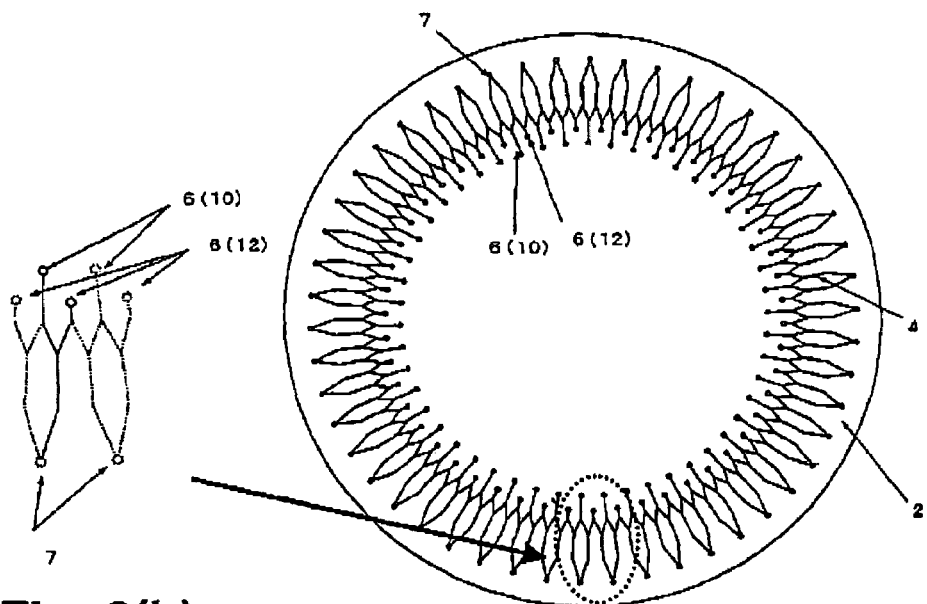
Fig. 6(b)  Fig. 6(a)

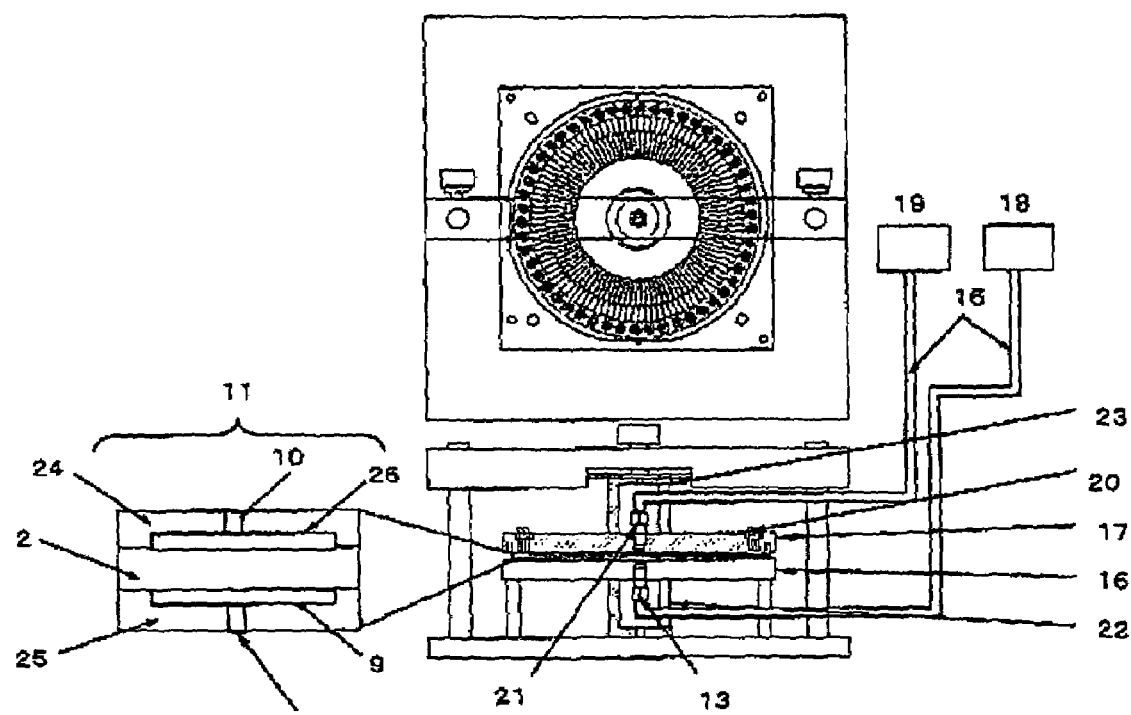
Fig. 9(b)
Fig. 9(a)
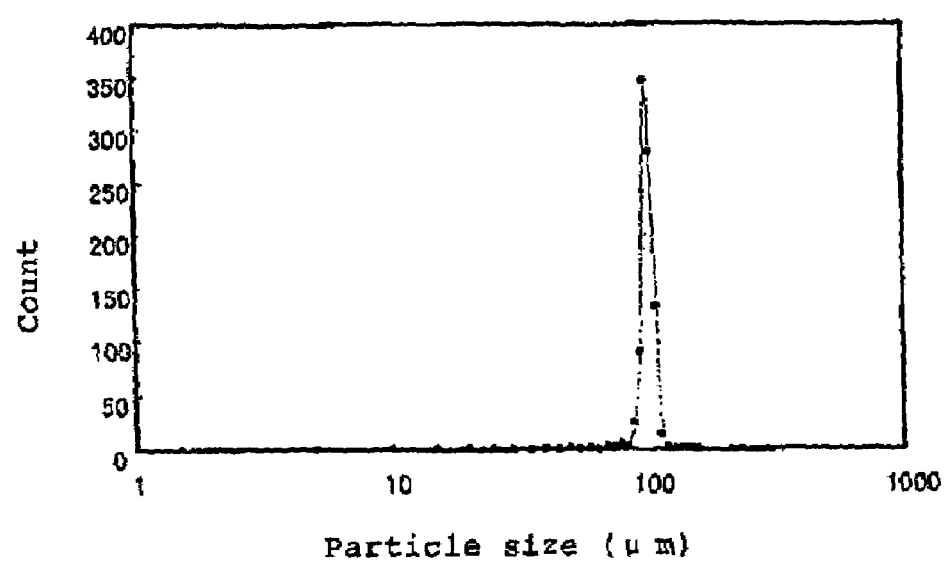
Fig. 10

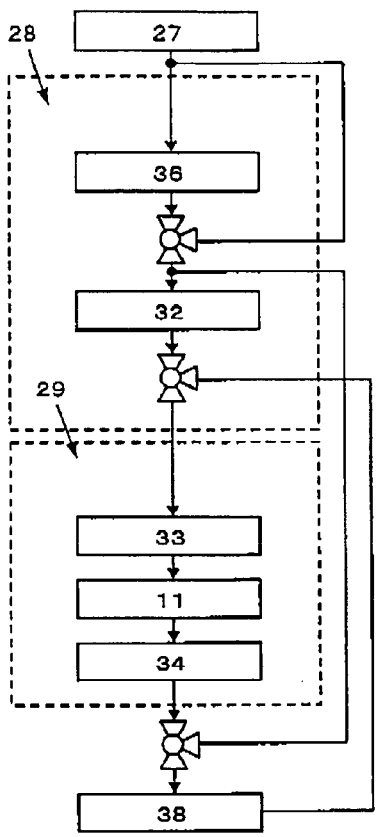 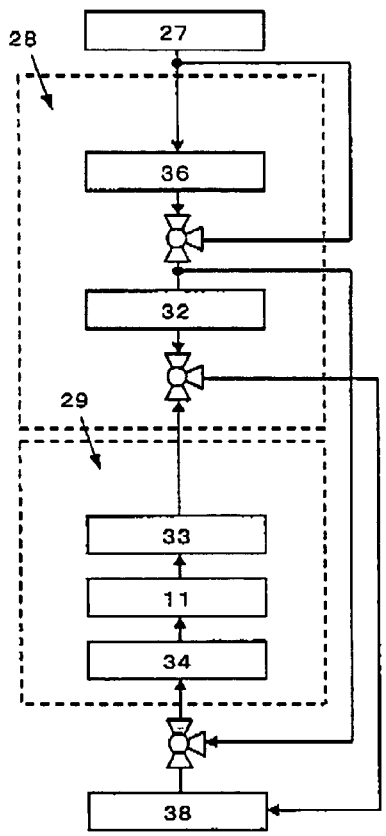 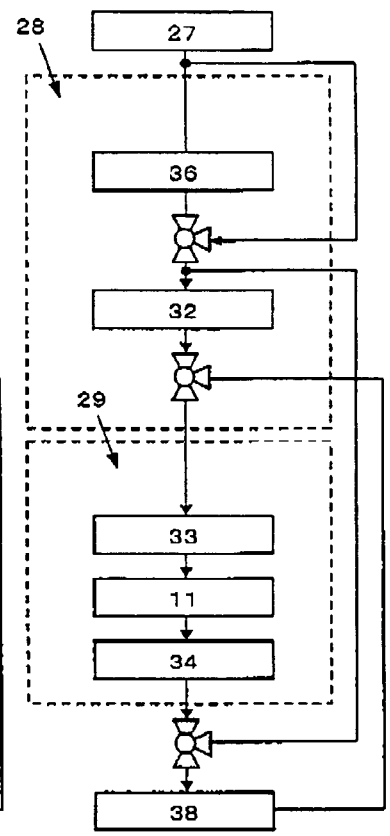
Fig. 12(a)   Fig. 12(b)   Fig. 12(c)

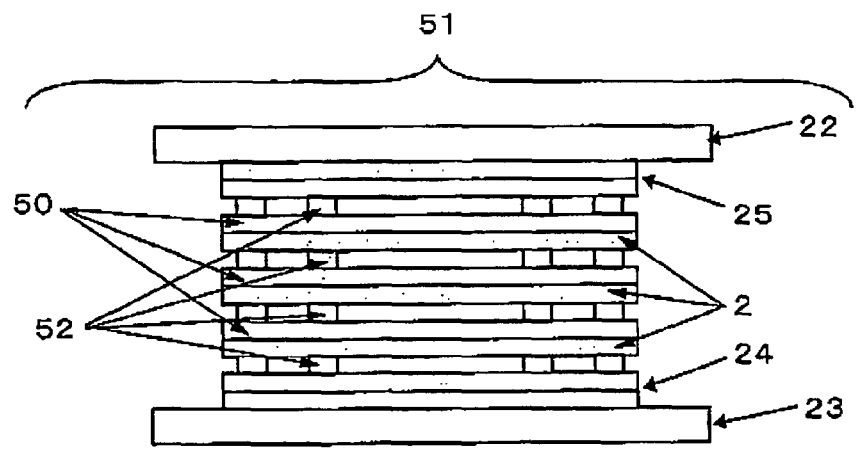
Fig. 17
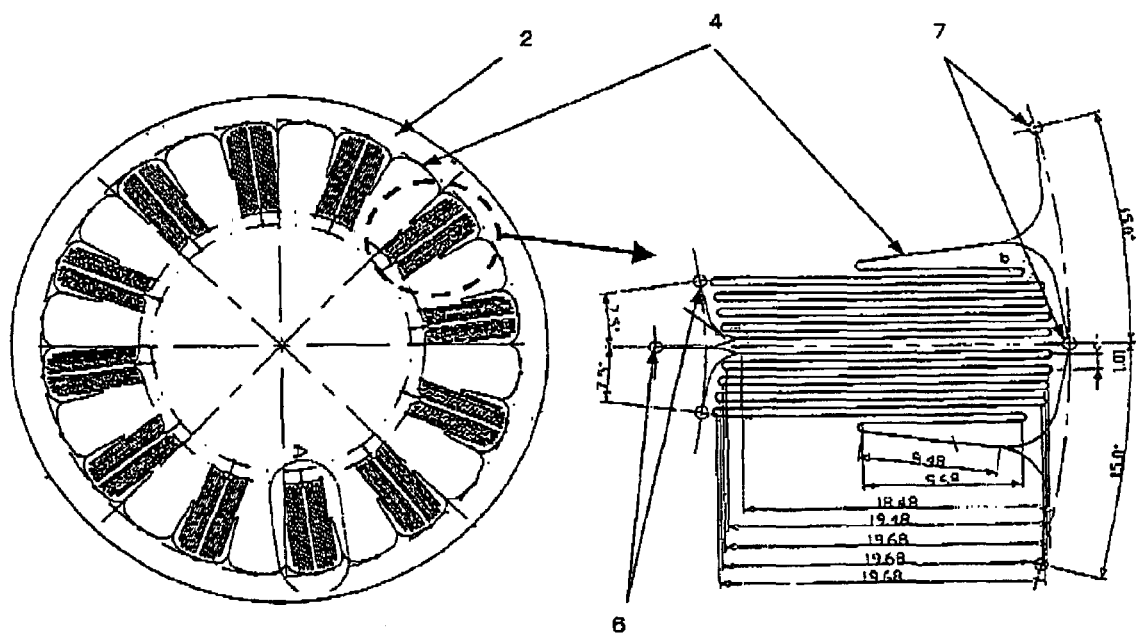
Fig. 18(a)
Fig. 18(b)
Enlarged view of
"A" portin (S=5/1)

Enlarged view of "A" portion (S=5/1)

FINE CHANNEL DEVICE, DESKSIZE CHEMICAL PLANT AND FINE PARTICLE PRODUCING APPARATUS EMPLOYING THEM

The present invention relates to a fine channel device for performing a chemical treatment in a fine channel or producing fine particles, a small chemical plant constituted by the fine channel device and a fine particle producing apparatus employing them.

In recent years, attention has been drawn to researches of employing a fine channel device having fine channels of about a few cm long and from about a few μm to a few hundreds of μm wide and deep in a few cm square glass substrate, and feeding fluid in the fine channels to perform a chemical treatment to produce a chemical synthetic substance (for example, refer to a non-patent document 1: "Fast and high conversion phase-transfer synthesis exploiting the liquid-liquid interface formed in a microchannel chip" by H. Hisamoto et al., Chem. Commun., published in 2001, pages 2662-2663) or to produce fine particles (for example, refer to a non-patent document 2: "Producing of fine droplet in liquid by employing a microchannel" by T. Nishisako et al, 4th Chemical and microsystem research conference text, published in 2001, page 59).

The width and the depth of the fine channels are generally from a few tens of μm to a few hundreds of μm. For this reason, the amount of the product produced in a fine channel is about a few tens of μL per minute. Mass production of chemical synthetic materials or particles in the fine channel device in industry, is generally mentioned to be archivable by increasing the degree of integration of fine channels formed in the fine channel substrate, or by piling-up the fine channel substrates each having fine channels piling-up, in a three-dimensional space. Such an embodiment is also called as numbering up of fine channels.

However, as such a technique for integrating fine channels, there has been reported only examples where a few fine channel substrates each having one fine channel are piled-up for test purpose, so far (for example, refer to a non-patent document 3: "Synthesizing in high productivity microchannels in a pile-up microreactor" by Kikutani et al., 3rd Chemical and microsystem research conference text, published in 2001, page 9). There has not been investigated a practical embodiment wherein from a few tens to a few hundreds of fine channels are disposed two-dimensionally and a fluid is fed evenly to all the fine channels, and further, from a few to a few tens of the above fine channel substrates each having from a few tens to a few hundreds of fine channels integrated, are disposed in three-dimensionally and fluid is fed evenly to all the fine channels. Therefore, industrial mass production by fine channels has been extremely difficult. Namely, achieving a small chemical plant constituted by the above fine channels has conventionally been extremely difficult.

From such a background, a mechanism for feeding a liquid evenly to each of fine channels to cope with the increase of the degree of two-dimensional and three-dimensional integration of the fine channels, and actualization of a small chemical plant having such a mechanism has a basic constituent element, have eagerly been demanded.

The present invention is proposed in consideration of the above conventional circumstances, and it is an object of the present invention to provide a fine channel device which is used for performing a chemical treatment or producing fine particles, and which has an improved degree of integration of fine channels in two-dimensionally and three-dimensionally, and which is capable of feeding a fluid to all of the fine channels evenly to produce a large quantity of products, and to provide a small chemical plant having the fine channel device as a fundamental constituent, which is capable of achieving a quantity of production comparable to that of a conventional large-scale chemical plant.

In order to solve the above mentioned problems, the present invention provides a fine channel device comprising fine channels for introducing at least one fluid to perform a chemical treatment for the introduced fluid or for producing fine particles from the introduced fluid, wherein the fine channel device comprises at least one fluid supply device having a storage space of a circular or polygonal recess form for temporarily storing the introduced fluid, and supply channels of linear and/or curved form, formed in a radial direction from the storage space, and the supply channels are communicated with each of fine channels of a fine channel substrate having fine channels. The present invention further provides a small chemical plant of desk size comprising a plurality of the above-mentioned fine channel devices as fundamental constituents, means for supplying at least one fluid to the plurality of the fine channel devices, and means for recovering products formed by performing the chemical treatment for the fluid or fine particles produced from the fluid. The above-mentioned problems of fine channel devices in conventional techniques could be solved by the present invention, and the present invention is completed. Hereinafter, the fluid storage space in the fluid supply device of the present invention, may also be referred to as a reservoir tank. The small chemical plant of desk size having a plurality of the fine channel devices of the present invention as fundamental constituents, is referred to as a desksize chemical plant.

Now, the present invention will be described in detail.

Fine Channel Device

The fine channel device of the present invention comprises at least one fluid inlet port for introducing at least one fluid, at least one fine channel for performing a chemical treatment of the fluid or for producing fine particles by the fluid, and at least one fluid outlet port for discharging at least one fluid applied with the chemical treatment or at least one fluid containing the fine particles produced; wherein:

the fine channel device is constituted by at least one fluid supply device for supplying the fluid into the fine channel and at least one fine channel substrate having the fine channel;

the fluid supply device comprises at least one perforated opening as a fluid inlet port for introducing the fluid, a storage space for temporarily storing the introduced fluid which is communicated with the fluid inlet port, and at least one supply channel of linear and/or curved form, formed in a radial direction, which is communicated with at least one fluid inlet port formed in the fine channel substrate to supply the fluid from the storage space to the fine channel; and said at least one fluid supply device has at least one perforated opening formed in the fluid supply device, and said at least one perforated opening communicates with at least one fluid outlet port of the at least one fine channel in the fine channel substrate, the perforated opening being used as a fluid outlet port for discharging the fluid.

Here, the fluid to be introduced may be a gas or a liquid. The chemical treatment means mixture, a chemical reaction, extraction or separation. Producing particles means confluenting at least two types of fluids having different interfacial tensions at a confluenting point of fine channels and shearing one fluid by another fluid to produce fine particles. Here, the particles in this document may be liquid type fine particles, namely fine droplets.

The fluid supply method may be a method of introducing the liquid from a liquid feeding pump through e.g. a capillary tube to the fine channel device, or using a micropump provided in the fine channel device as the liquid feeding pump.

The storage space for temporarily storing the liquid fed from the liquid feeding pump, functions to minimize the pulsation by the pump. The supply channels of a linear and/or curved form, formed in a radial direction from the storage space, are communicated with the fine channel substrate having fine channels for performing a chemical treatment or for producing particles, to supply a fluid evenly to the fine channels formed in the fine channel substrate.

When at least two types of fluids are supplied to the fine channel substrate to perform a chemical treatment or to produce fine particles, it is preferred to dispose the fluid supply devices on the top and bottom of the fine channel device of the present invention. Especially in a case of supplying two types of fluids, by disposing fluid supply devices having reservoir tanks for different type of fluids on the top and bottom of the fine channel substrate and connecting them, it is possible to constitute a fine channel device having a very compact structure and comprising many fine channel substrates.

Here, the reservoir tank and the fine channel substrate are produced on substrates having an optional thickness by applying common processes such as photolithography and wet etching or dry etching, cutting, or molding. The production process may be selected depending on the material of the fine channel substrate used or the size of fine channels. Further, the material of the reservoir tank and the fine channel substrate is not particularly limited, and may, for example, be a glass substrate such as a quartz glass, a soda lime glass or Pyrex, a resin substrate such as polycarbonate, polyimide, POM, nylon, nylon-66 or polyether imide, metal or ceramics. The material may be selected depending on the chemical resistance or the heat resistance against the fluid to be used or chemical treatment conditions.

The reservoir tank and the fine channel substrate may be directly bonded by fusion bonding, a UV curable resin or a thermo-setting resin, or may be bonded by e.g. pressure-bonding. Further, the reservoir tank or the fine channel substrate may be connected with e.g. O-rings or sealing materials sandwiched between them.

For microchannels of the microchannel device of the present invention, fluid inlet ports are provided for introducing at least two types of fluids for performing a chemical treatment such as mixing, chemical synthesizing, extraction or separation, or for producing fine particles.

Further, in the fine channel device of the present invention, at least one fluid can be introduced from the storage space of the fluid supply device into the fluid inlet ports of the fine channel substrate having fine channels independently. Further, supply channels of the at least two fluid supply devices are disposed so as not to overlap with supply channels of other fluid supply devices.

Namely, when the shape of a fine channel is e.g. a Y-shape, in order to introduce different fluids into the respective two introduction channels branched in Y-shape, it is preferred that supply channels from that top and bottom reservoir tanks are each individually connected with an introduction channel corresponding to it. Further, in order to connect the introduction channels branched in Y-shape individually with the supply channels communicating with the reservoir tanks, the supply channels formed in a radial direction from the reservoir tank in the fluid supply device, are preferably disposed so as not to overlap with the supply channels formed in a radial direction from a reservoir tank of the other fluid supply device in the opposite position.

Further, the fine channel device of the present invention is constituted by piling-up at least two fine channel substrates having a fine channel for performing a chemical treatment for a fluid or for producing fine particles from a fluid, wherein each fluid inlet port of the fine channel is communicated with any one of the supply channels of the fluid supply device. By this construction, it is possible to make the fine channel device further compact. Further, in the fine channel device of the present invention, the shape of the storage space communicating with each of the fine channels is preferably a circular recess or a polygonal recess. By this construction, it becomes possible to feed a liquid to each of the fine channels in the fine channel device more evenly. By forming the reservoir tank in a polygonal shape, the pressure loss at a time of feeding a fluid can be minimized, and if the fluid to be introduced is a liquid, it is possible to quickly remove bubbles contained in the reservoir tank which may prevent a uniform liquid feeding.

In the accompanying drawing:

FIG. 1 is a view showing the fundamental constituent elements of the fine channel device of the present invention.

FIG. 2 is a view showing two fluid supply devices and one fine channel substrate having perforated openings.

FIG. 5(a) is a perspective view showing the fine channel device after bonding.

FIGS. 5(b) to 5(d) are cross-sectional views showing the fine channel device after bonding.

FIG. 6(a) is a view showing a fine channel substrate having 100 fine channels disposed thereon.

FIG. 6(b) is an enlarged view of the portion circled in FIG. 6(a).

Figures 7A, 7B:
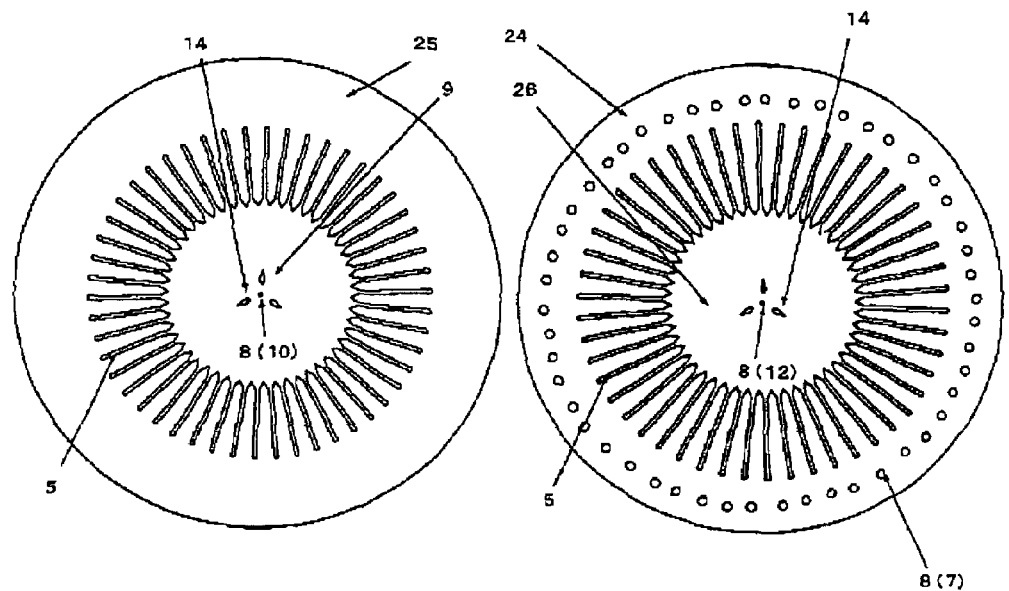

FIGS. 7(a) and 7(b) are conceptual views showing two types of fluid supply devices.

Figure 8:
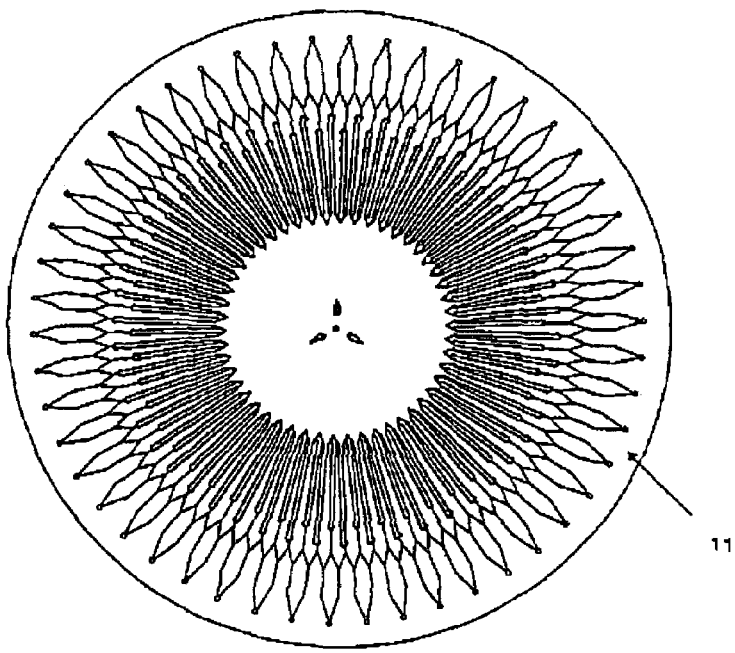

FIG. 8 is a view showing a fine channel device comprising a fine channel substrate having 100 fine channels, sandwiched by a first fluid supply device and a second fluid supply device from the top and the bottom, the views being observed from the top.

FIG. 9(a) is a conceptual view of the fine channel device of the present invention, assembled in a fluid supply system.

FIG. 9(b) is an enlarged view of a portion of the fine channel device.

FIG. 10 is a measurement result of the particle size distribution of fine droplets produced in 100 sets of Y-shaped fine channels.

Figure 11:
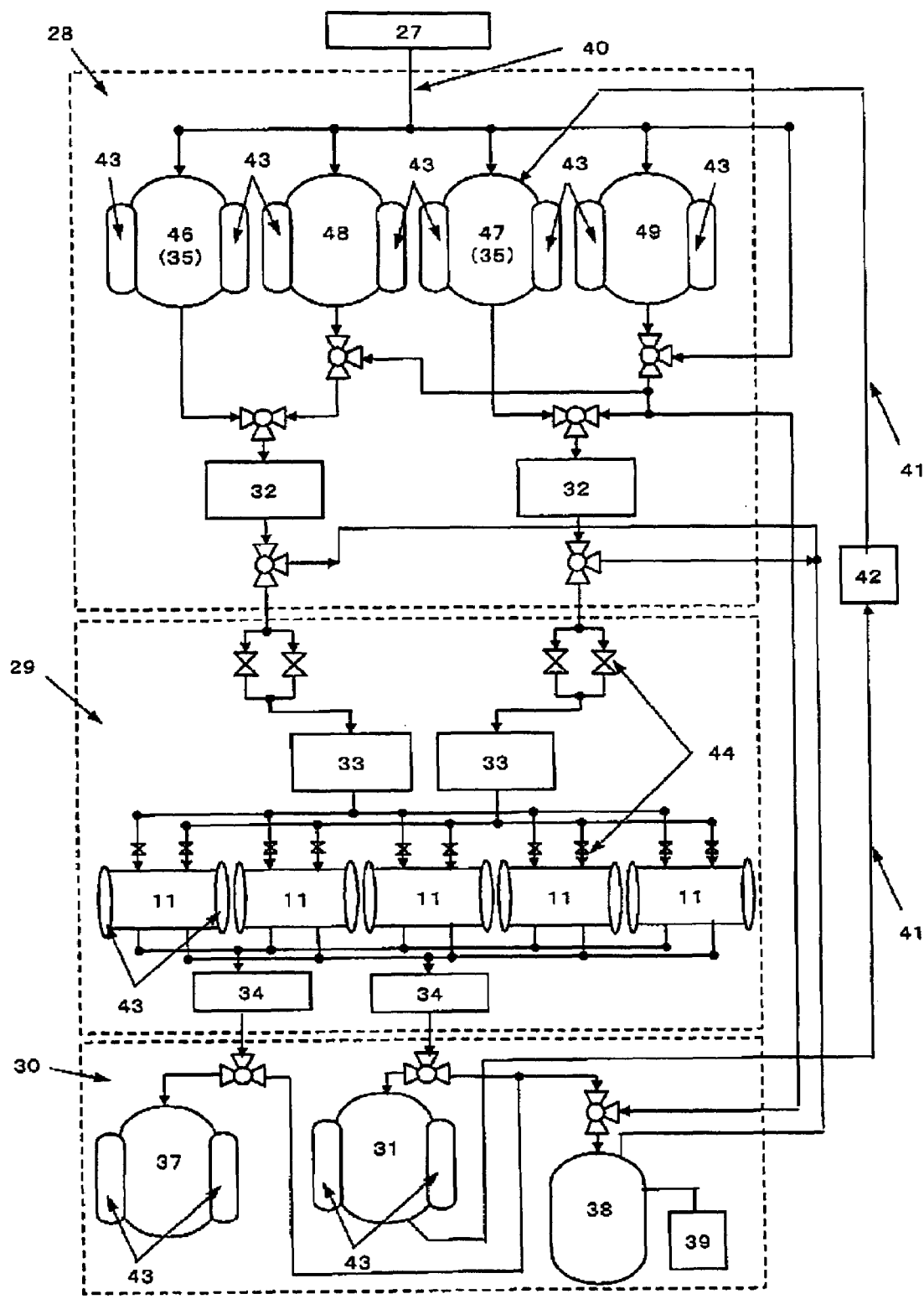

FIG. 11 is a block diagram showing the construction of a desksize chemical plant of the present invention.

FIG. 12(a) is a block diagram showing the route of cleaning liquid in the piping arrangement when the cleaning liquid is flown in the regular direction.

FIG. 12(b) is a block diagram showing the route of cleaning liquid in the piping arrangement when it is flown in the reverse direction.

FIG. 12(c) is a block diagram showing the route of a gas supplied in the piping arrangement.

Figure 13:
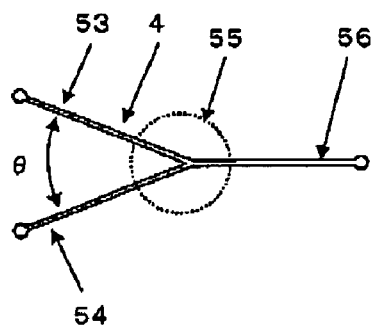

FIG. 13 is a conceptual diagram showing a basic shape of a Y-shaped fine channel of the present invention.

Figure 14:
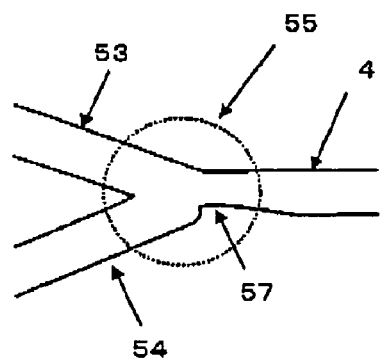

FIG. 14 is a conceptual view showing the fine channel used in Example 2 wherein a protrusion is formed on the dispersion phase introduction channel side of the confluenting point of the Y-shaped microchannel.

Figure 15:
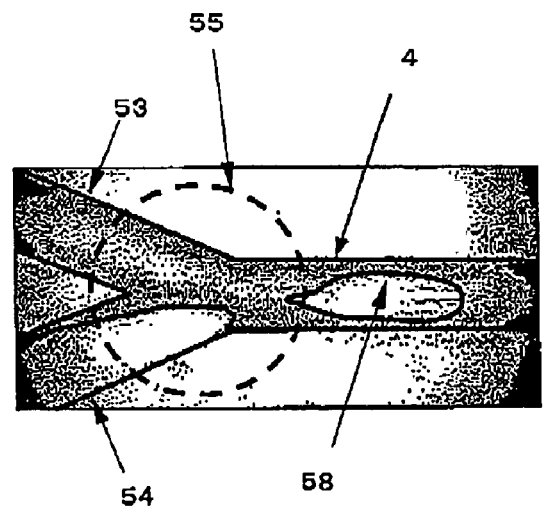

FIG. 15 is a view showing a picture when a fine droplet is formed by shearing a dispersion phase by a continuous phase at the confluenting point of a Y-shaped fine channel.

Figure 16:
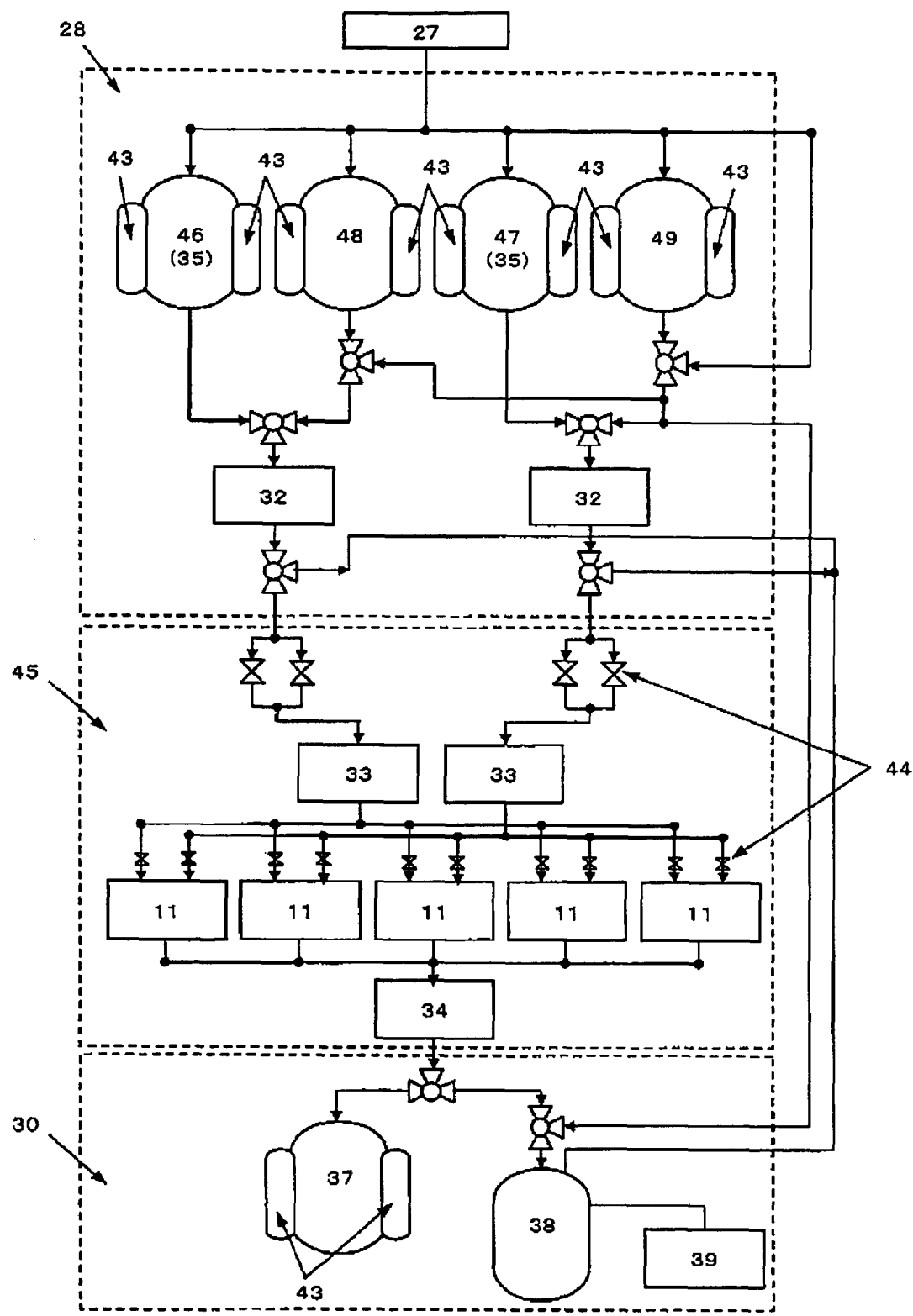

FIG. 16 is a block diagram showing the construction of the fine particle producing apparatus of Example 2 of the present invention.

FIG. 17 is a cross-sectional view of one block of fine channel devices of this embodiment.

FIGS. 18(a) and 18(b) show an example of fine channel substrate for chemical reaction wherein each of the channels has a turned shape and having two fluid inlet ports and two fluid outlet ports, and the channels are integrated in the circumferential direction of the disk-shaped fine channel substrate.

Figure 19A:
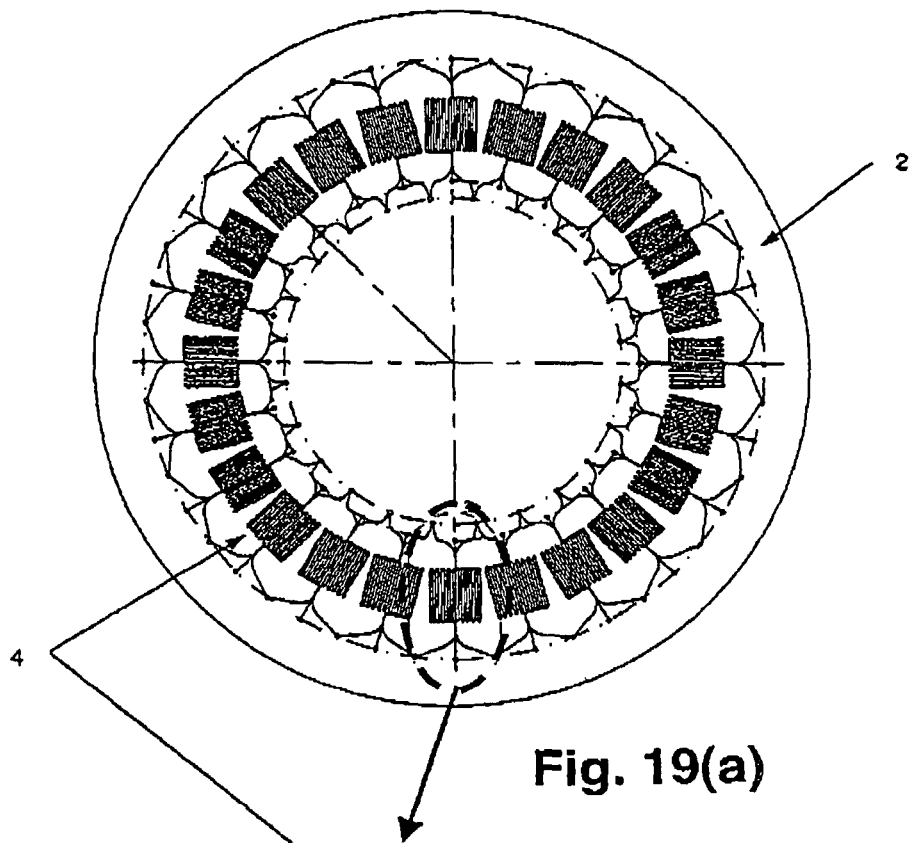
Figure 19B:
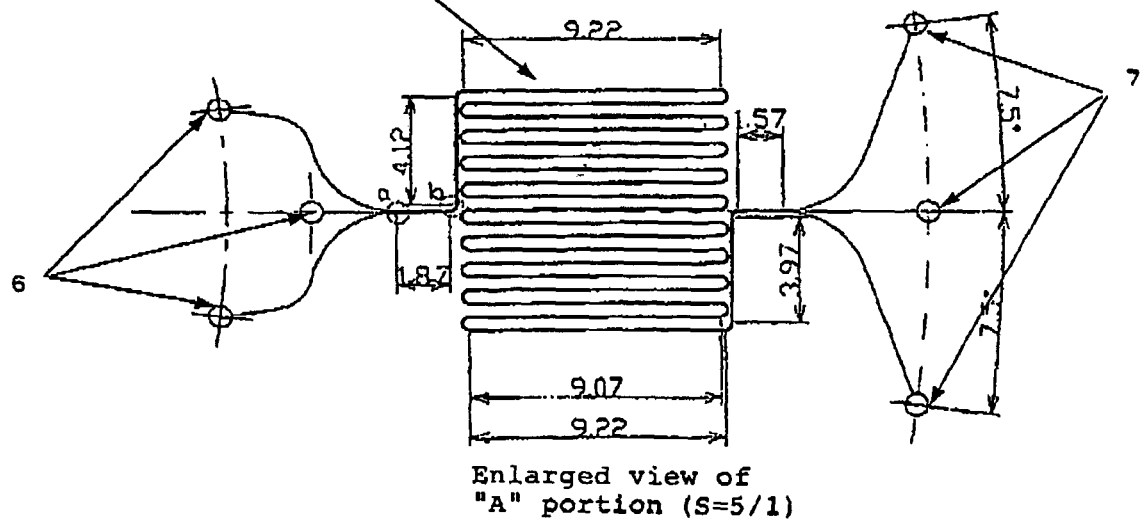

FIGS. 19(a) and 19(b) show an example of fine channel substrate for chemical reaction, wherein each of the channels is formed in a turned shape and has three fluid inlet ports and three fluid outlet ports, and the channels are integrated in the circumferential direction of the disk-shaped fine channel substrate.

Figure 20:
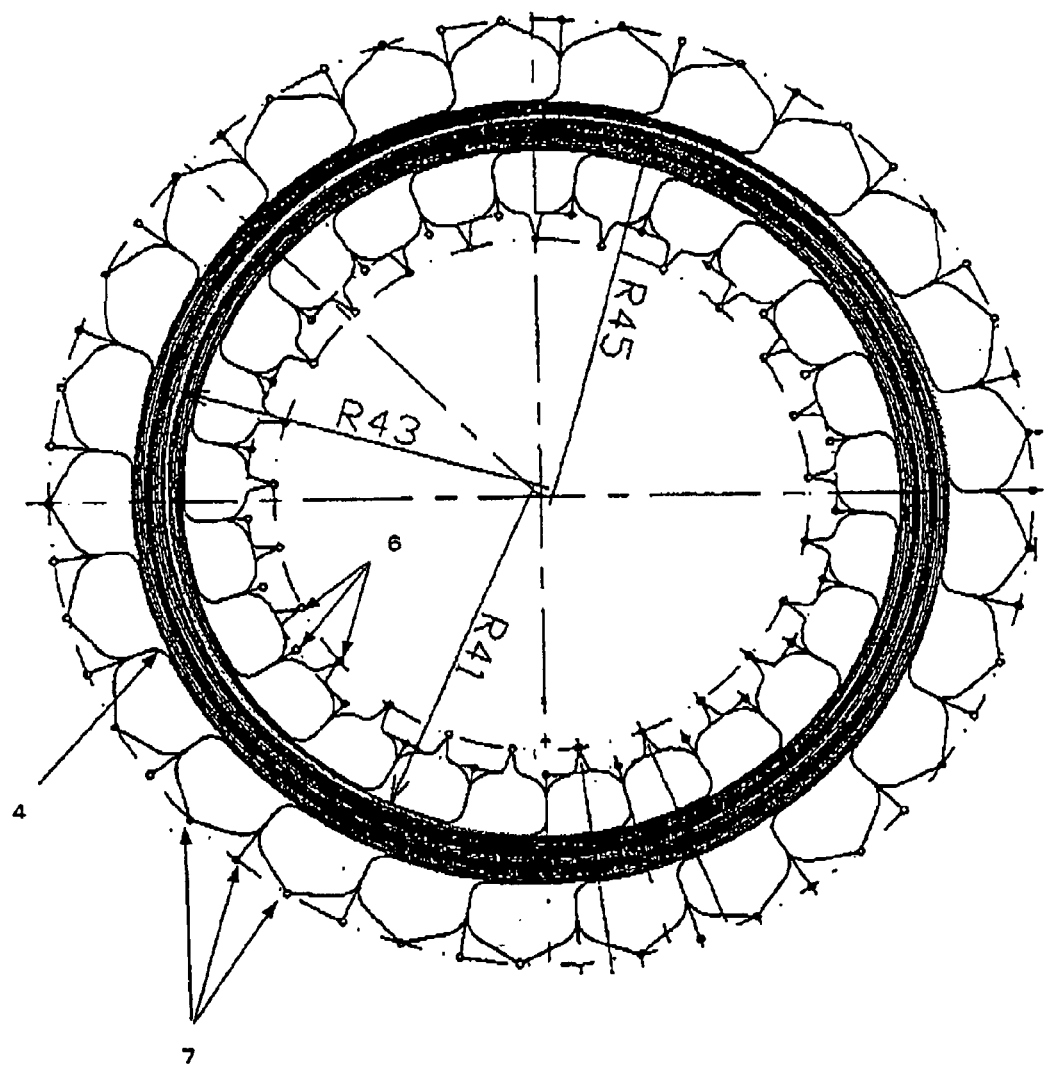

FIG. 20 shows an example of fine channel substrate for chemical reaction, wherein each of the fine channels is formed in a shape having its longitudinal direction in a circumferential direction of the disk-shaped fine channel substrate, and has three fluid inlet ports and three fluid outlet ports, and the fine channels are integrated in the radial direction of the disk-shaped fine channel substrate.

Figure 21:
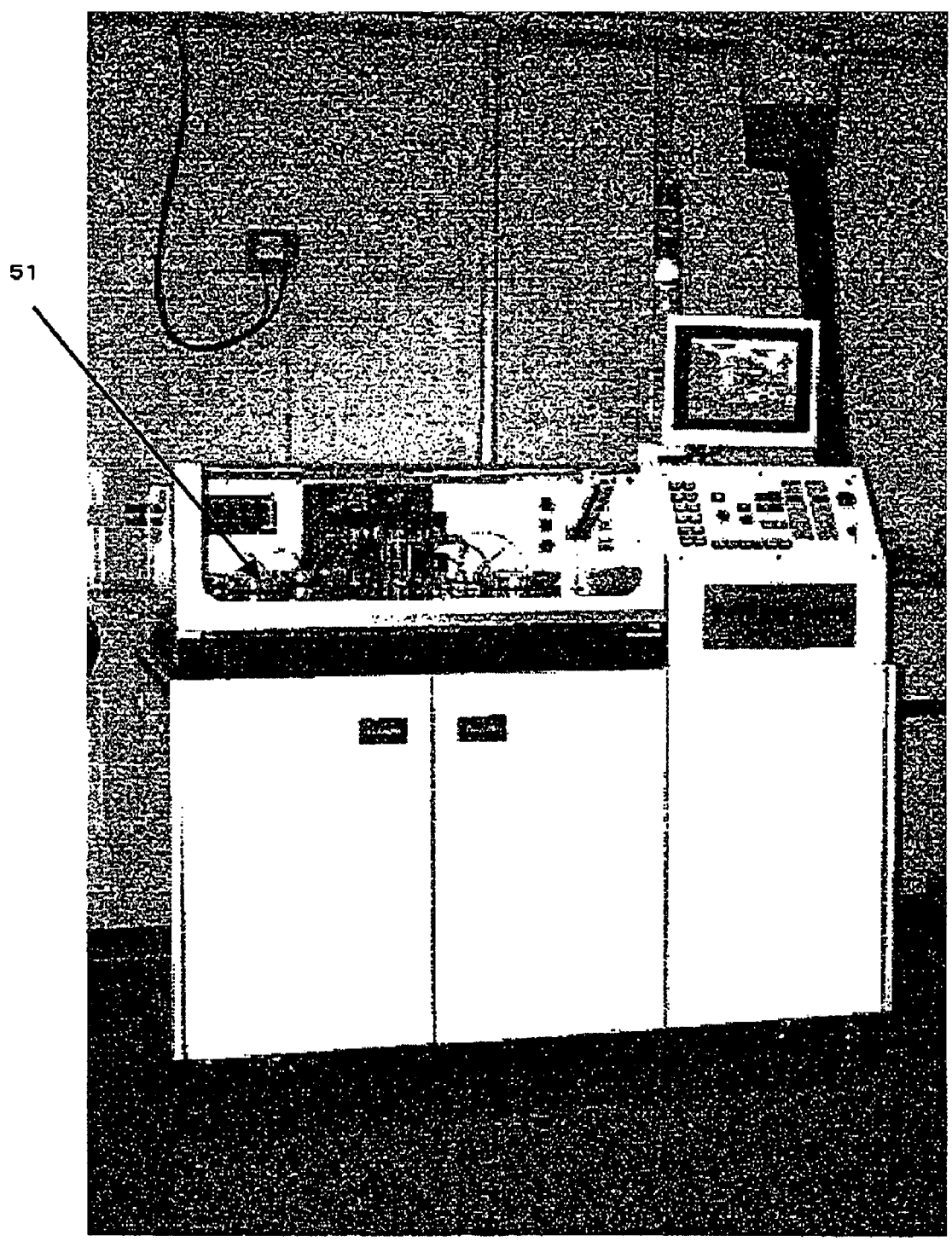

FIG. 21 is an overview of a fine particle producing apparatus comprising five blocks of the fine channel device of Example 2.

From now, the fine channel device of the present invention will be described more specifically using figures.

FIG. 1 shows fundamental constituents of a fine channel device of the present invention. FIG. 1(a) shows a fluid supply device (3) having a fluid storage space (1) for supplying a liquid, FIG. 1(b) shows a fine channel substrate (2) having Y-shaped fine channels (4) for performing a chemical treatment for a liquid or for producing fine droplets from the liquid, and FIG. 1(c) shows a fluid supply device (3) having a fluid storage space (1) for supplying a fluid.

Further, FIG. 2 shows two fluid supply devices and one fine channel substrate each having a perforated opening. FIG. 2(a) shows an example of fluid supply device (25) having a first fluid storage space (1) for supplying the first fluid, which has a perforated opening (8) formed in the fluid storage space. FIG. 2(b) is a fine channel substrate (2) having Y-shaped fine channels (4) for performing a chemical treatment for a liquid or for producing fine droplets from the liquid, which is an example having perforated openings (8) formed at two fluid inlet ports (6) of each of the fine channels and at a fluid outlet port (7) of each of the fine channels. FIG. 2(c) shows an example where a perforated opening (8) is formed in the fluid storage space of the fluid supply device (24) having a second fluid storage space (1) for supplying the second fluid, and where a perforated opening (8) is formed at a position corresponding to the position of a fluid outlet port of each of fine channels formed in the fine channel substrate.

Figure 3:
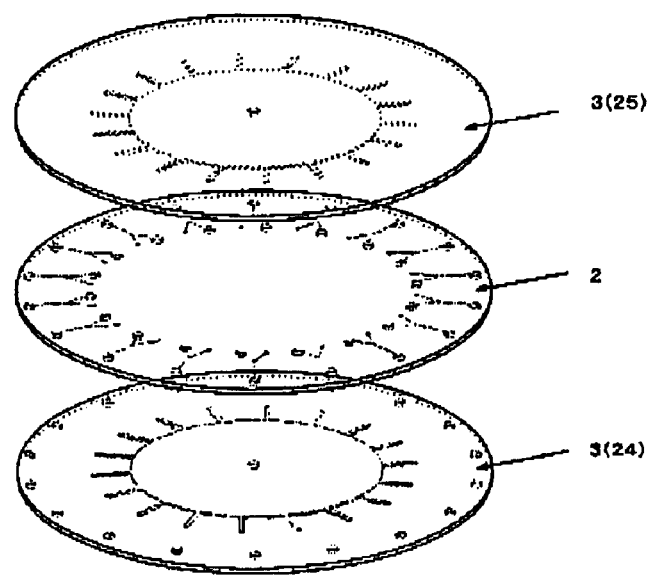
FIG. 3 is a conceptual view of a fine channel substrate having perforated openings is sandwiched by a first fluid supply device having perforated openings and a second fluid supply device having perforated openings from the top and the bottom.

FIG. 3 is a conceptual view of a fine channel substrate (2) having perforated openings shown in FIG. 2, sandwiched by a fluid supply device (25) having perforated openings for supplying a first fluid, and a fluid supply device (24) having perforated openings for supplying a second fluid, from the top and from the bottom respectively.

Figure 4:
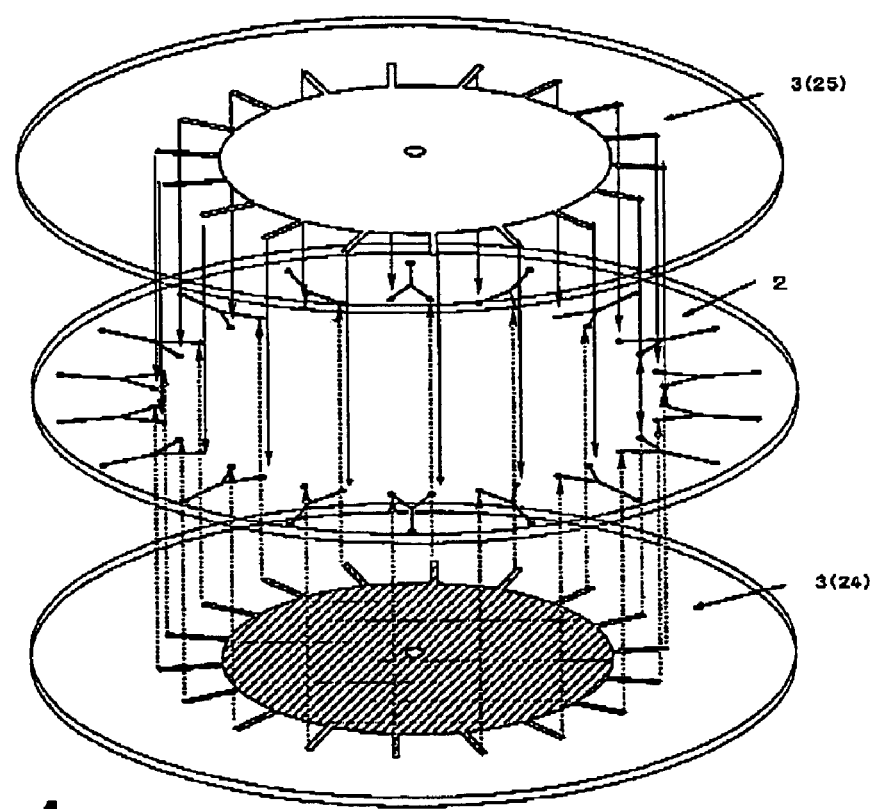
FIG. 4 is a view showing the positional relationship of each of the perforated openings when the fine channel substrate having perforated openings is sandwiched by the first fluid supply device having perforated openings and the second fluid supply device having perforated openings from the top and the bottom.

Further, FIG. 4 is a view showing the positional relationship of the perforated openings when the fine channel substrate (2) having perforated openings shown in FIG. 3, is sandwiched by the fluid supply device (25) having perforated openings for supplying the first fluid, and the fluid supply device (24) having perforated openings for supplying the second fluid from the top and bottom respectively.

As a method for piling-up, the fluid supply device (25) for supplying a first fluid, the fluid supply device (24) for supplying a second fluid, and the fine channel substrate (2) in FIG. 2 each capped, may be bonded together with sealing members such as O-rings.

FIGS. 5(a) to 5(d) are a perspective view and cross-sectional views of a fine channel device after it is bonded. FIG. 5(a) shows the fine channel device after bonded. FIGS. 5(b), 5(c) and 5(d) show views in section A-A', section B-B' and section C-C' of the fine channel device of FIG. 5(a) respectively.

As shown in the view of section A-A' in FIG. 5(b), supply channels (5) extending in a radial direction in the fluid supply device (25) on the top side for supplying the first fluid, are each communicated with one of the fluid inlet ports (6) of a fine channel (4) formed in Y-shape in the fine channel substrate (2). Further, supply channels (5) extending in a radial direction in the fluid supply device (24) on the bottom side for supplying the second fluid, are each communicated with the other fluid inlet port (6) of a fine channel (4) formed in Y-shape in the fine channel substrate (2), a perforated opening (8) communicated with the fluid inlet port. By such a structure, two fluids can be supplied from the first fluid supply device through the second fluid supply device via fluid channels to each of the Y-shaped microchannels.

Further, as illustrated in the view of section B-B' in FIG. 5(c), a fluid outlet port (7) of the Y-shaped fine channel (4) formed in the fine channel substrate (2), is communicated with a perforated opening (8) of the fine channel substrate (2) communicated with the fluid outlet port and with the fluid outlet port (7) of the fluid supply device (24) for supplying the first fluid, whereby products produced in the fine channel can be discharged.

Further, as shown in the view of section C-C' in FIG. 5(d), the first fluid inlet port (10) and the second fluid inlet port (12) respectively communicated with a reservoir tank (9) for storing the first fluid and a reservoir tank (26) for storing the second fluid respectively provided in the fluid supply device (25) on the top side for supplying the first fluid and in the fluid supply device (24) on the bottom side for supplying the second fluid respectively, are formed as perforated openings, whereby it becomes possible to supply two types of fluids from the outside to the fine channel device of the present invention.

Here, the above-mentioned fine channel device is shown in order to describe the present invention in a easily understandable way. The shape and the number of reservoir tanks, the shape and the number of fine channels, the number of introduction channels of a fine channel and the number of discharge channels of a fine channel are not limited thereto.

FIG. 6(a) shows a case where the degree of integration of Y-shaped fine channels is increased, namely, a fine channel substrate having 100 fine channels. Further, FIG. 6(b) is an enlarged view of the circled portion in FIG. 6(a).

The fluid supply devices for two types of fluids actually have embodiments shown in FIGS. 7(a) and 7(b). Supply channels (5) extending in a radial direction from a reservoir tank (9) for storing the first fluid and a reservoir tank (26) for storing the second fluid respectively communicated with a first fluid inlet port (10) and a second fluid inlet port (12), have each a width gradually narrowing towards the periphery in order to improve the withstanding pressure of the cylindrical space and to improve the performance of removing bubbles.

FIG. 8 is a view in an overlapping state, showing a fine channel device (11) constituted by a fine channel substrate having 100 fine channels sandwiched from the top and the bottom by a first fluid supply device and a second fluid supply device, as they are observed from the top. The fine channels, reservoir tanks and the supply channels shown in FIG. 6 to FIG. 8 were produced on a 5 inch Pyrex (trademark) substrate by employing common photolithography and wet etching processes. Further, the fine channel substrate and the two fluid supply devices were bonded by commonly known fusion bonding. However, they may be connected via members such as O-rings as another bonding method.

Further, as shown in FIG. 7, in order to improve the withstanding pressure in the reservoir tank, a plurality of tear-shaped reinforcement columns (14) are provided in the vicinity of the fluid inlet port.

FIG. 9 is a schematic view showing an embodiment where the fine channel device of the present invention is incorporated in a fluid feeding system, and the fine channel device is connected with a fluid feeding pump (18) for a first fluid and with a fluid feeding pump (19) for a second fluid by means of capillary tubes (15) and flared fitting (21). The fine channel device is sandwiched by a substrate holder A (16) and a substrate holder B (17) and fixed by a fixing holder A (22) and a fixing holder B (23). The structure is such that the product can be taken out from the fluid outlet port of the fine channel device by a flared fitting (20) for discharging. The flared fitting (21) has a structure capable of introducing and discharging a fluid by a syringe member without leakage, and it is preferred to interpose an O-ring to minimize the leakage of the fluid. The flared fitting (21), the fixing holders (22) and (23), and substrate holders (16) and (17) are preferably made of a resin, a glass or a metal. Especially, in order to observe the internal status, they are preferably made of a transparent glass or a transparent resin.

By such a structure, it becomes possible to feed a fluid at a uniform liquid feeding rate to a plurality of fine channels for reaction or to fine channels for producing fine droplets, and it becomes possible to provide a fine channel device for producing uniform products in a large quantity in a short time.

Desksize Chemical Plant

The desksize chemical plant of the present invention is a desksize chemical plant comprising a plurality of the fine channel devices, means for supplying at least one fluid to the plurality of fine channel devices, and means for recovering products formed by the chemical treatment of the fluid or fine particles formed by the fluid. As shown in a block diagram of FIG. 11, the desksize chemical plant of the present invention is constituted by a raw material tank unit (28), a chemical plant unit (29) and a recovering tank unit (30).

The chemical plant unit is characterized by comprising a plurality of the fine channel devices (11), means for supplying to the fine channel devices at least one fluid as a raw material of the products produced by a chemical treatment, or as a raw material for producing fine particles, and means for recovering products produced by the chemical treatment or particles produced in the plurality of fine channel devices. Further, the desksize chemical plant of the present invention is characterized by, as shown in FIG. 11, comprising a distributor (33) for facilitating to supply a fluid to a plurality of fine channel devices, and having a collector (34) for facilitating to recover products produced by performing a chemical treatment or fine particles produced in each of the fine channel devices. By such a construction, the pipe arrangement for supplying raw materials to the fine channel devices, for chemical treatments of the fluids in the fine channel devices, or for producing particles, can be simplified.

For example, in a case where two fluids as raw materials are fed at a rate of 10 μL/min to perform a chemical treatment in a Y-shaped microchannel, the fluid discharged after it is chemically treated can be taken out at a rate of 20 μL/min. By this single fine channel, only 10 L of chemically treated fluid can be obtained even if the fluid is continuously flown into the fine channel without ceasing in full-year. However for example, if 100 fine channels are formed in a fine channel substrate, 10 of the fine channel substrates are piled-up to constitute a fine channel device as a block, 10 blocks of the fine channel devices, are arranged in parallel, two raw material fluids are fed at the same feed rate, and the fluids are continuously flown for 1 year without ceasing in the same manner, 100,000 L of chemically treated fluid can be obtained. Assuming that the specific gravity of the fluid is 1 and all of the product is usable, 100 tons of the product can be obtained each year, which means that a plant of a desk size having a production capacity comparable to a conventional chemical plant of a building size in a scale of small to medium, can be achieved. Here, the building size specifically means a building size of a few tens of meters square and a few meters high, and the desk size specifically means a desk size having a width of about 1 to 2 m, a depth of about 1 m and a height of about 1 to 2 m. Here, it is a matter of course that the fine channel device of the present invention which can feed fluids to every single fine channel, which constitutes the fine channel device of the present invention, uniformly in the completely same condition, is necessary to achieve this.

Further, as means for feeding fluids as raw materials supplied to the desksize chemical plant of the present invention, there are a mechanical pump such as a diaphragm pump or a plunger pump, or a pump of pressure-feeding type. However, there is no particular restriction. It is preferred to use a pump having little pulsation or little flow rate variation as much as possible. For example, the raw material tank unit shown in FIG. 11 has a raw material tanks (35) and a cleaning fluid tank 1 (48) and a cleaning fluid tank 2 (49), and the fluid is fed by a pressure-feeding type pump employing a gas supplied from an $N_2$ gas supplier (27). By such a pressure-feeding type pump, it is possible to supply the fluid to the plurality of fine channel devices stably with relatively little pulsation, it is possible to supply a raw material fluid to the plurality of fine channels constituting the plurality of fine channel devices at a stable feed rate, and it is possible to perform a chemical treatment for the fluid stably or to produce fine particles stably.

Further, the raw material tank unit of the desksize chemical plant of the present invention is characterized by comprising a degassing device (32) shown in FIG. 11 used at a time of supplying the raw material. By this construction, for example, mixing of gas into the raw material fluid, which may arise a problem when the pressure feed type pump is employed, can be avoided, and mixing of bubbles into the reservoir tanks for the plurality of fine channel device can be avoided as much as possible, whereby the obstacle against feeding uniformly to each of the fine channels due to the bubbles in the reservoir tanks can be removed, and the stability is further improved in the process of chemical treatment for the fluid or of the production of particles.

Further, the desksize chemical plant of the present invention comprises means for cleaning the fine channels constituting the fine channel device. As the means for cleaning, a cleaning fluid tank 1 (48) and a cleaning fluid tank 2 (49) are provided in the raw material tank unit in FIG. 11, and a mechanism is provided for feeding the fluid in the regular direction of the feeding direction of the raw material fluid, or in the reverse direction of the feeding direction of the raw material fluid from the collector for recovering the products. The feeding route in the piping in a case of cleaning by feeding the fluid in the regular direction is shown in FIG. 12(a), the feeding route in the piping in a case of cleaning by feeding the fluid in the reverse direction is shown in FIG. 12(b). By this construction, repeatedly feeding of the fluid in the regular and reverse directions becomes possible to improve the effect of the cleaning. Here, the fluid in this paragraph generally means a cleaning liquid. By this feature, sufficient cleaning of the plurality of fine channels constituting the fine channel device becomes possible, and clogging of each of the fine channels can be prevented.

Further, the desksize chemical plant of the present invention preferably comprises means for adjusting the fluid pressure produced in the fine channel devices so that it becomes possible to feed a fluid more uniformly.

The desksize chemical plant of the present invention has, as shown in FIG. 11, a gas supply pipe (40) as means for supplying a gas to the fine channel device. The feeding route in the piping in a case of feeding the gas to the fine channel device is shown in FIG. 12(c). By providing this mechanism, gas can be supplied to the plurality of fine channels constituting the fine channel device to dry the inside of the plurality of fine channels after the cleaning, and the plurality of fine channels can be maintained in a clean condition.

The desksize chemical plant of the present invention comprises in a raw material tank unit (28) as shown in FIG. 11, a raw material storage tanks (35) for storing a raw material liquid to be supplied to the fine channel device, and comprises in a recovering tank unit (30) a recovering tank (37) for recovering products produced by performing a chemical treatment for the fluid or fine particles produced in the fine channel device. The desksize chemical plant further comprises means for automatically supplying the raw material fluid to the raw material storage tank, and means for automatically feeding the products produced by performing a chemical treatment for the fluid or the particles produced in the fine channel device, from the recovering tank. By such a construction, automatic supplying of a raw material to the raw material tank, and automatic feeding of a product from the recovering tank, become possible, whereby continuous production for long period of time becomes possible regardless of the storage amount of the raw material tank or the recovering tank.

Further, the desksize chemical plant of the present invention further comprises, as shown in FIG. 11, a temporarily recovering tank (31) for temporarily storing the raw material discharged from the fine channel device other than the products in order to reuse at least one raw material among the raw materials for performing a chemical treatment or for producing fine particles, and a recovering pipe (41) as means for recovering the raw material to be reused from the above tank to the predetermined raw material tank (47) for storing the raw material, and further comprises a reuse-raw material separator/refiner (42) as means for separating and refining only the raw material to be reused from the raw material containing other raw materials and/or products of a chemical treatment or fine particles produced. By providing such means, it becomes possible to reuse, for example, an extremely expensive catalyst used for a heterogeneous system catalyst reaction as a chemical treatment (for example, a chiral phase transfer catalyst having an effect to improve the optical selectivity in an asymmetric synthesis) can be reused, whereby the cost can be reduced and the environmental impact can be reduced.

Further the desksize chemical plant of the present invention further comprises, as shown in FIG. 11, a temperature control device (43) capable of controlling the temperature of the raw material tank (47), the recovering tank (37) and the fine channel devices, whereby stable supply of raw material fluid, and stable production and storage of products produced by performing a chemical reaction or particles produced in the fine channel device, can be achieved regardless of the place where the desksize chemical plant of the present invention is installed.

In the desksize chemical plant of the present invention, as shown in FIG. 11, a plurality of supply valves (44) for adjusting the quantity of the fluid supplied at a time of supplying a raw material fluid to each of the fine channel devices, are provided for every one block of the fine channel devices, and for every fluid to be supplied. By adjusting the plurality of valves, it is possible to adjust the supply flow rate of the raw material for every one block of the fine channel devices and for every fluid to be supplied, whereby the conditions of a chemical treatment or the conditions of producing particles in the plurality of fine channels constituting the fine channel devices can be relatively freely changed for the process, and fine flow rate control becomes possible.

The desksize chemical plant of the present invention further comprises automatically controllable means in the process of at least one member selected from the group consisting of supplying raw material fluid to the fine channel device, recovering products produced by the chemical treatment or fine particles produced in the fine channel device, cleaning the fine channel device and drying the fine channel device. By such a construction, no troublesome operation such as adjusting operation of valves is not necessary.

In FIG. 11, reference numeral 39 shows a vacuum pump.

Fine Particle Producing Apparatus

The fine particle producing apparatus of the present invention comprises means for supplying at least one fluid for producing fine particles to the fine channel device which constitutes the desksize chemical plant, and means for recovering the fine particles produced in the fine channel device, and is an apparatus for producing fine particles wherein the fluid for producing fine particles comprises a liquid containing a raw material for producing gel, and a liquid containing a dispersing agent for producing gel. By such a construction, the desksize chemical plant of the present invention can be specialized as a fine particle producing apparatus.

Further, in the fine particle producing apparatus of the present invention, the fine channel constituting the fine channel device has a Y-shape so that a dispersion phase and a continuous phase introduced from the respective inlet ports of the fine channel device are confluented in the fine channel to produce fine particles, wherein the angle at which the channel for introducing the dispersion phase crosses the channel for introducing the continuous phase is adjusted to control the size of fine particles produced. By such a construction, it becomes possible to produce particles in larger quantity and more stably by employing the particle producing apparatus of the present invention.

Now, the present invention will be described in further detail with reference to Examples. However, it should be understood that the present invention is by no means restricted to such specific Examples.

EXAMPLE 1

FIG. 9 is a conceptual view of an example of the present invention. The fine channel device (11) of the present invention shown in FIG. 9 is constructed such that a fluid supply device (24) of FIG. 7(b) for supplying a second fluid is bonded on the top side of the fine channel substrate (2) shown in FIG. 6(a), and a fluid supply device (25) of FIG. 7(a) for supplying a first fluid is bonded on a lower side to form the fine channel device (11) shown in FIG. 8 as a view observed from the top. As the material of the fine channel substrate and the fluid supply devices bonded on the top and bottom, Pyrex (tradename) substrates of 5 inch in diameter and 1.2 mm thick were employed. Fine channels formed on the fine channel substrate and reservoir tanks and supply channels were formed in the supply channel devices, by means of common photolithography and wet etching processes. The fine channel substrate and the fluid supply devices were bonded by means of common fusion bonding. Perforated openings of the fluid inlet ports of fine channels of the fine channel substrate, a perforated opening of the reservoir tank of the first fluid supply device, a perforated opening of the reservoir tank and perforated openings for fluid outlet ports of the second fluid supply device, were perforated openings each having a diameter of 1 mm formed by means of machining.

As shown in FIG. 6(a), 100 Y-shaped fine channels (4) were formed in the fine channel substrate (2), fluid inlet ports for introducing two fluids communicated with each of the fine channels were connected to fluid introduction ports of different fluid supply devices in order to introduce the respective fluids via supply channels (5) of a linear shape disposed in a radial direction from fluid storage spaces (1) provided in the two fluid supply devices connected on the top and lower side of the fine channel substrate. Here, with respect to the position of fluid inlet ports (6) communicated with introducing channels for introducing fluids to Y-shaped fine channels, in order to obtain spaces to secure a sufficient diameter of fluid inlet port for introducing two types of fluids, fluid inlet ports (10) for introducing the first fluid were disposed on a concentric circle having a radius of 35 mm, fluid inlet ports (12) for introducing the second fluid were disposed on a concentric circle having a radius of 40 mm so that their positions in the radial direction were different. Fluid outlet ports (7) from the fine channels were disposed on a concentric circle having a radius of 55 mm. Here, in order to reduce the number of the fluid inlet ports and the fluid outlet ports, as shown in FIG. 8, the fluid inlet ports were disposed so that two introduction channels were branched from each of the fluid inlet ports, and the fluid outlet ports were disposed so that two discharging channels were confluented at each of the fluid outlet ports.

The fine channels formed inn the fine channel substrate have a width of 110 μm and a depth of 50 μm, and are each formed in a Y-shape in a space between from 40 mm to 55 mm in the radial direction from the center of the fine channel substrate. The angle of Y-shape formed by introduction channels was 44 degrees and the length of each of the fine channels from the confluenting point of the Y-shape to the fluid outlet port was 12 mm.

Reservoir tanks formed in the fluid supply devices each has a diameter of 50 mm and a depth of 300 μm, and the shape of the reservoir tanks is a polygonal shape as shown in FIG. 7. From each of apex of the polygonal reservoir tank, a linear supply channel was formed in a radial direction towards the periphery. The supply channels from the reservoir tank of the first fluid supply device each has a length of 15 mm, a width of 1 mm and a depth of 300 μm, and the supply channels from the reservoir tank of the second fluid supply device each has a length of 20 mm, a width of 1 mm and a depth of 300 μm. 50 Supply channels were formed from the reservoir tank of each of the fluid supply devices. Further as shown in FIG. 7, in order to improve the withstanding pressure inside the reservoir tank of each of the fluid supply devices, three tear-shaped reinforcement columns (14) each having a length of 5 mm, a maximum with of about 1 mm and a height equal to the depth of the reservoir tank, were formed in each reservoir tank on a circle having a radius of about 8 mm in the vicinity of the fluid inlet port at an interval of 120° on the concentric circle.

The above-mentioned fine channel device (11) of the present invention was sandwiched by a substrate holder A (16) and a substrate holder B (17) to be fixed as shown in FIG. 9. To the substrate holder A, a flared fitting (13) was connected to connect it to a first fluid-feeding pump (18) via a capillary tube (15) and introduce the first fluid to the fluid inlet port (10) for introducing the first fluid, which is communicated with a perforated opening communicated with a reservoir tank (9) for storing the first fluid in the fluid supply device (25) for supplying the first fluid. To the substrate holder B, a flared fitting (21) was connected to connect it to a second fluid-feeding pump (19) via a capillary tube (15) and to introduce a second fluid into the second fluid inlet port (10) communicated with a perforated opening communicated with a reservoir tank (26) for storing the second fluid in the fluid supply device (24) for supplying the second fluid. Further, to the substrate holder B, 50 flared fittings (20) for discharging fluids were connected to respectively communicate with 50 fluid outlet ports each communicated with a perforated opening communicated with a fluid outlet port of each of the fine channels formed in the fine channel substrate and a perforated opening formed on the periphery side of the first fluid supply device. From these flared fittings for discharging fluids, fine droplets produced in the fine channels were discharged and recovered through capillary tubes.

In this example, 3% of polyvinyl alcohol aqueous solution was fed to the fine channel device at a feeding rate of about 1.0 mL/min by the first fluid feeding pump, and a mixed solution of divinylbenzene and butyl acetate was fed to the fine channel device at a feeding rate of about 0.5 mL/min by the second fluid feeding pump. The two types of fluids were introduced to the respective fluid inlet ports provided to the reservoir tanks connected via the respective flared fittings for introducing the fluids. The two types of fluids introduced were temporarily stored in the respective reservoir tanks, introduced into the respective introducing channels of the Y-shaped fine channels formed in a Y-shape through supply channels extended in a radial direction from the reservoir tanks, and fine droplets were produced by shearing the mixed solution of divinylbenzene and butyl acetate as a dispersion phase by the polyvinyl alcohol aqueous solution as a continuous phase at the confluenting points of the Y-shaped fine channels.

In order to confirm the effect of the fine channel device of the present invention, the fluid discharged from the 50 flared fittings for discharging communicated with the fluid outlet ports of the fine channels, was recovered at each of the fluid outlet ports. Among fine droplets contained in the recovered liquid, 100 fine droplets were sampled to measure the distribution of the droplet size. As a result, the average size was about 100 μm and its distribution was within a range of from 5.6 to 7.3% with respect to each of the 50 fluid outlet ports. From this result, it was shown that by employing the fine channel device of the present invention, the liquid was supplied to each of the fine channels very evenly and under the same condition. Here, the distribution of droplet size means a value obtained by dividing the standard deviation of the droplet size of the fine droplets sampled by the average droplet size, which is a reference value showing the width of the distribution of the droplet size.

Further, the liquid discharged from 50 liquid outlet ports was all recovered in the same sample bottle, and the 100 fine droplets recovered were sampled to measure the distribution of the droplet size of the fine droplets. As a result, as shown in FIG. 10, the average droplet size was about 100 μm, its distribution was about 6.3%, which means that very uniform fine droplets were obtained by the fine channel device of the present invention as a whole. Further, the fine particles were obtained at a production rate of 1.5 mL/min in a form of slurry. Here, when the fine droplets were produced by introducing 3% polyvinyl alcohol aqueous solution as a continuous phase and a mixture solution of divinylbenzene and butyl acetate as a dispersion phase, into a Y-shaped fine channel having the same shape as the Y-shaped fine channel employed in this Example, and by shearing the dispersion phase by the continuous phase at the confluenting point of the Y-shaped fine channel, then conditions under which the fine droplets having an average droplet size of about 100 μm and a droplet size distribution of within a range of from about 5 to 8% as the same level of the above Example, are such that the feeding speed of the continuous phase is about 10 μL/min, the feeding speed of the dispersion phase is about 5 μL/min, and the production rate of the slurry containing the fine droplets obtained by feeding the liquids is 15 μL/min. Therefore, the fine channel device of this embodiment having 100 fine channels integrated, produces just about 100 times as much as the slurry produced by a single fine channel. Accordingly, it has been shown that by integrating fine channels by employing the fine channel device of the present invention, product having the same physical properties as that produced by a single fine channel can be produced in a large quantity depending on the number of the channels integrated.

EXAMPLE 2

FIG. 16 shows the construction of the fine particle producing apparatus of Example 2 of the present invention. As shown in FIG. 16, it is constituted by an $N_2$ gas supplier (27), a raw material tank unit (28) for storing raw materials, a fine particle producing unit (45) constituted by five fine channel devices (11), a recover tank unit (30) for recovering fine particles produced or storing waste liquid at a time of cleaning, and pipes and valves for connecting them. The $N_2$ gas supplier supplies a $N_2$ gas via the pipes to a raw material tank 1 (46) and a raw material tank 2 (47) or to a cleaning fluid tank 1 (48) and a cleaning fluid tank 2 (49), whereby it becomes possible to supply the raw materials and the cleaning liquid.

In this Example, the raw material tank 1 stored a mixture of a monomer (styrene), butyl acetate and benzoyl peroxide as a dispersion phase, the raw material tank 2 stored 3% polyvinyl alcohol aqueous solution as a continuous phase, the cleaning fluid tank 1 stored ethanol as a cleaning liquid, and the cleaning tank 2 stored purified water as a cleaning liquid. Further, as the case requires, the temperature of the raw material tank 1 and the raw material tank 2 can be controlled by a temperature control device (43). In Example 2, the fine particle production unit was constituted by five fine channel devices, but the number of the fine channel devices is not limited thereto.

The fine particle producing unit further comprises distributors (33) for supplying each of the dispersion phase and the continuous phase to the five fine channel devices for producing fine particles, and a collector (34) for collecting fine particles produced in the five fine channel devices, and the pipes and valves for connecting them. Further, a degassing device (32) was provided between each of the raw material tanks and each of the distributors. Fine particles produced in the fine particle producing unit or waste liquid at a time of cleaning, were got together in the collector in the fine particle producing unit, and stored in the recovering tank (37) or in the waste liquid tank (38) connected via pipes and valves from the collector.

The fine channel devices constituting the fine particle producing unit, were each made of 5 inch Pyrex (tradename) glass substrate. As shown in FIG. 6, 100 Y-shaped fine channels (4) were formed by common photolithography and wet etching processes in the Pyrex (tradename) glass substrate, and further, the fluid inlet ports (6) and fluid outlet ports (7) as perforated openings were formed at predetermined positions by machining to produce the fine channel substrate (2). Here, the basic shape of the Y-shaped fine channel formed is shown in FIG. 13. The mixture of a monomer (styrene), butyl acetate and benzoyl peroxide as the dispersion phase, was introduced through this first phase introduction channels (54), and the 3% polyvinyl alcohol aqueous solution as the continuous phase was introduced through a continuous phase introduction channel (53), and fine droplets (58) were continuously produced by shearing the dispersion phase by the continuous phase at a confluenting point (55) of the fine channel (4) as shown in FIG. 15, and they were discharged through an outlet channel (56) in FIG. 13. Here, in this Example, in order to make the shearing of the dispersion phase by the continuous phase more stably and easily, the fine channel (4) having a protrusion (57) formed at the dispersion phase introducing channel side of the confluenting point (55) of the fine channel (4), was employed. As shown in FIG. 6, each of the fine channels were formed to have, in the same manner as Example 1, a width of 110 μm and a depth of 50 μm, the protrusion was formed to have a convex portion of at most 25 μm towards inside of the channel and to have a length of 200 μm in the channel length direction. The Y-shaped fine channels were formed in the space between 40 mm to 55 mm in a radial direction from the center of the fine channel substrate and distributed in the peripheral direction of the disk-shaped fine channel substrate to have concentric distribution. The angle of Y-shape formed by the introduction channels was 44°, and the length of the fine channel from the confluenting point of the Y-shape to the fluid outlet port was 12 mm.

FIG. 17 is a cross-sectional view showing one block of the fine channel devices of this embodiment. As shown in FIG. 17, a cover substrate (50) having perforated openings formed at the predetermined positions and having the same shape as the fine channel substrate (2) was bonded to cover the surface of the fine channel substrate (2) where the fine channels were formed, by thermal bonding as a common method for bonding glasses.

Further as shown in FIG. 7, in the fluid supply device (25) for supplying the first fluid as the dispersion phase, and the fluid supply device (24) for supplying the second fluid as the continuous phase, the reservoir tank (9) for storing the first fluid as the dispersion phase, the reservoir tank (26) for storing the second fluid as the continuous phase, and the supply channels (5) disposed in a radial direction for supplying raw materials to the Y-shaped microchannels, were formed by common photolithography and wet etching processes. Further, in order to cover the surface of each of the fluid supply devices where the reservoir tank and supply channels are formed, cover substrates (50) each having perforated openings (8) formed by machining at predetermined positions and having the same shape as the fluid supply devices were bonded by fusion bonding as a common method for bonding glasses as shown in FIG. 17.

Raw materials were introduced through perforated openings (8) formed at the center of the fluid supply device (25) for supplying the first fluid and at the center of the fluid supply device (24) for supplying the second fluid.

Three of the above fine channel devices bonded were piled-up, and a fluid supply device (25) for supplying the first fluid and a fluid supply device (24) for supplying the second fluid were piled-up on its top and under sides. The above three fine channel substrates and two fluid supply devices disposed on the top and under sides of them were piled-up with preformed gaskets (52) having perforated openings at predetermined positions for sealing each space between the substrates. Further, all of the fine channel devices and the preformed gaskets were fixed by a fixing holder A (22) and a fixing holder B (23) made of metal to constitute a fine channel device (51) for producing fine particles shown in FIG. 17.

FIG. 21 shows an overview of a fine particle producing apparatus comprising fine blocks of the above fine channel devices. The apparatus has a width of about 1.5 m, a depth of about 0.8 m and the height of about 1.4 m.

To the above fine particle producing apparatus, continuous phase was fed at a feed rate of 1 L/hr and dispersion phase was fed at a feed rate of 0.5 L/hr from the respective raw material tanks by employing a pressure feeding pump for 10 hours (since the number of fine channels integrated in the fine channel apparatus is 1,500, the continuous phase was fed at a feed rate of 10 μL/min, and the dispersion phase was fed at a feed rate of about 5 μL/min to each of the fine channels). As a result, a slurry-formed liquid containing about 15 L of fine particles was obtained. This corresponds to a production capacity of producing the slurry-formed liquid containing about 5,000 L of fine particles by operating 10 hours a day for 1 year. This means that a production capacity comparable to a fine particles producing plant of building size in a scale of small to medium size was achieved in a desk size plant.

Table 1 shows the average particle size and the distribution of the particles produced by the fine particle producing apparatus of Example 2, measured with respect to each of the five fine channel devices, and the average particle size and the distribution of the fine particles recovered from all of the five fine channel devices and measured together. The distribution of the fine particles was measured with respect to 100 fine particles sampled in the same manner as Example 1. As shown in FIG. 1, the average particle size of the fine particles recovered from all of the five fine channel devices was 85.5 μm, and the distribution was 9.7%, which means fine particles having a very good distribution was obtained and a fine particle producing apparatus not requiring a classification process was achieved.

From the above Examples, a fine particle producing apparatus having a production capacity capable of producing several thousands of liter of fine particles contained in a slurry-formed fluid a year which is comparable to the production capacity of a fine particle producing plant of building size having a few meters high and a few tens of meters square, which is of a small to medium scale, and capable of producing fine particles having a very good distribution not requiring a classification process, was achieved by a desksize chemical plant of about 1.5 m wide, about 0.8 m deep and about 1.4 m high for the first time in the world.

In this Example, the fine particle producing apparatus comprised, as the fine particle producing unit, the chemical plant unit comprising five fine channel devices employing fine channel substrates each having Y-shaped fine channels formed. However, it is matter of course that the desksize chemical plant for producing products produced by a chemical reaction in the fine channels, can be constituted by fine channel devices constituted by fine channel substrates each having fine channels suitable for the chemical reaction instead of fine channel substrates having fine channels formed for producing fine particles.

For example, FIG. 18 shows an example of a fine channel substrate (2) having 12 fine channels (4) each formed to have two fluid inlet ports (6), two fluid outlet ports (7), a length of 20 cm, a width of 100 μm and a depth of 20 μm. Since it is necessary to maximize a time in which two fluids are in contact in the fine channels to proceed the chemical reaction, each of the fine channels has a shape turning eleven times in order to maximize the length of the fine channel, and the fine channels were integrated in a peripheral direction of the disk-shaped fine channel substrate. By employing such fine channels, it becomes possible to introduce two fluids containing two different reaction substrates from the fluid inlet ports, perform a chemical reaction in fine channels, extract the produced product into one of the fluids, and separate the fluid containing the extracted product from the other fluid by means of two-phase laminar flow separation at the exits of the fine channels to recover the fluid containing the product. The other fluid not containing the product may be wasted. But as shown in FIG. 1, it may be subjected to a treatment in a reuse-raw material separator/refiner (42) for performing a treatment to reuse the fluid as the raw material, and returned to the raw material tank, whereby it becomes possible to reuse the raw material, reduce the cost and reduce the environmental impact.

FIG. 19 shows an embodiment of a first fine channel substrate having fine channels (4) each having three fluid inlet ports (6) and three fluid outlet ports (7) wherein each of the fine channels has a length of 20 cm, a width of 150 μm and a depth of 20 μm, and 24 the fine channels (4) were formed in the fine channel substrate. Since it is necessary to maximize the time in which three fluids are in contact in the fine channels to perform a chemical reaction, each of the fine channels has a shape turning nineteen times in order to maximize the length of the fine channel, and the fine channels were integrated in the peripheral direction of the disk-shaped fine channel substrate. By employing such fine channels, it becomes possible to introduce three fluids containing three different reaction substrates from the fluid inlet ports, perform a chemical reaction in the fine channels, extract the product into one of these fluids, and separate the fluid containing the extracted product from other two fluids by means of a three-phase laminar flow separation at the exits of the fine channels to recover the substrate containing the products.

Further, FIG. 20 shows a second embodiment of the fine channel substrate having fine channels (4) each having three fluid inlet ports (6) and three fluid outlet ports (7). Each of the fine channels has a length of 20 cm, a width of 150 μm and a depth of 20 μm, and 24 the fine channels (4) were formed in the fine channel substrate (2). Since it is necessary to maximize the time in which three fluids are in contact to perform the chemical reaction, the longitudinal direction of the fine channels were formed in a circumferential direction of the disk-shaped fine channel substrate (2), and 24 of these fine channels were formed from the outer periphery towards the inner periphery to thereby maximize the length of the fine channels. The characteristic of the fine channel shown in FIG. 20, is that since there is no turning point as compared with the fine channels shown in FIG. 18 and FIG. 19, the pressure loss at the turning points can be minimized, whereby stable feeding of the liquid in the fine channels becomes possible. By employing this fine channel, in the same manner as FIG. 19, it is possible to introduce three fluids containing three reaction substrates from the fluid inlet ports, perform a chemical reaction in the fine channels, extract the produced product into one of the fluids, separate the liquid containing the extracted products from other two fluids by means of a three-phase laminar flow separation at the exit of the fine channels to recover the fluid containing the products.

Also in the fine channels of FIGS. 19 and 20, the fluids not containing the product may be wasted. But by preparing for each of the fluids the pipe for recovering (41) shown in FIG. 11 and the reuse-raw material separator/refiner (42) for performing a treatment for the fluid to reuse a raw material, it becomes possible to perform a treatment to make them reusable as raw materials in the reuse-raw material separator/refiner, and return them to the raw material tanks to be reused as raw material, whereby it becomes possible to reduce the cost and the environmental impact.

Further in the above, Examples of two and three fluid inlet ports and two and three fluid outlet ports were described. However, the numbers of the fluid inlet ports and the fluid outlet ports are not limited to the above Examples, and it is matter of course that the number of the fluid inlet ports and the number of the fluid outlet ports may not be the same.

Effect of the Fine Channel Device of the Present Invention

The fine channel device of the present invention is a fine channel device comprising at least one fluid inlet port for introducing at least one fluid, at least one fine channel for performing a chemical treatment of the fluid or for producing fine particles from the fluid, and at least one fluid outlet port for discharging at least one fluid applied with the chemical treatment or at least one fluid containing the fine particles produced;

wherein:
the fine channel device is constituted by at least one fluid supply device for supplying the fluid into the fine channel and at least one fine channel substrate having the fine channel;
the fluid supply device comprises at least one perforated opening as a fluid inlet port for introducing the fluid, a storage space for temporarily storing the introduced fluid, which is communicated with the fluid inlet port, and at least one supply channel of linear and/or curved form, formed in a radial direction, which is communicated with each of the fluid inlet ports of the at least one fine channel formed in the fine channel substrate to supply the fluid from the storage space to the fine channel; and
said at least one fluid supply device has at least one perforated opening formed in the fluid supply device, and the perforated opening communicates with each of the fluid outlet ports of the at least one fine channel in the fine channel substrate, the perforated opening being used as a fluid outlet port for discharging the fluid. In such construction having the storage space for temporarily storing the fluid supplied from a fluid feeding pump, the effect of pulsation by the pump can be minimized, and the supply channels of linear and/or curved form extending in a radial direction from the storage space can supply the liquid uniformly to all of the at least one fine channel formed in the fine channel substrate.

Further, the fine channel device of the present invention, comprises at least two fluid supply devices disposed on the top and under sides of at least one fine channel substrate lamination, whereby it becomes possible to supply at least two types of fluids so as to perform a chemical reaction or to produce fine particles into the fine channel substrate.

Further, the fine channel device of the present invention is a fine channel device which is constituted by piling-up at least two fine channel substrates having a fine channel for performing the chemical treatment or producing fine particles by the fluid, wherein each fluid inlet port for the fluid channel communicates with any one of the supply channels of the fluid supply device.

By such construction, it becomes possible to construct the fine channel device constituted by many fine channel substrates each having a plurality of fine channels in a very compact structure.

Further, the fine channel device of the present invention is a fine channel device wherein at least one introduced fluid can be introduced from the storage space of the fluid supply device into the fluid inlet port of the fine channel substrate having the fine channel independently. Also, it is a fine channel device wherein at least two supply channels of the fluid supply device are disposed so as not to overlap each of the supply channel of the fluid supply device. By such structure, it becomes possible to introduce different fluids into at least two introduction channels of fine channels formed in the fine channel substrate.

In the fine channel device of the present invention, the storage space communicating with each of the fine channels preferably has a shape of a circular or a polygonal recess. By making the storage space in such a shape, it becomes possible to supply the fluid to all fine channels formed in the fine channel substrate more uniformly. Particularly when the shape of the storage space is a polygonal recess, as compared with a circular recess, there are effects of reducing the pressure loss at a time of feeding the fluid, and of promptly discharging bubbles remaining in the storage space when the fluid to be handled is a liquid.

Effect of the Desksize Chemical Plant of the Present Invention

The desksize chemical plant of the present invention comprises a plurality of the fine channel devices, means for supplying at least one fluid to the plurality of fine channel devices, and means for recovering products produced by the chemical treatment for the fluid or fine particles produced from the fluid. By such a construction, a plant having a production capacity comparable to a conventional chemical plant of building size in a small to medium scale, can be achieved in a desk size scale.

Further, as means for feeding a raw material fluid to the desksize chemical plant of the present invention, a pump having little pulsation and little variation of the flow rate such as a pressure feeding type pump, can be employed, whereby the raw material fluid can be supplied to the plurality of fine channels constituting the plurality of fine channel devices at a stable feeding rate, and stable treatment to the fluid or stable production of fine particles becomes possible.

Further, the desksize chemical plant of the present invention comprises a degassing device for raw materials to be supplied, whereby it is possible to minimize bubbles mixed into the reservoir tanks for the plurality of fine channel devices, it is possible to remove the obstacle against uniform feeding of the fluid to each of the fine channels due to the bubbles in the reservoir tanks, and it is possible to further improve the stability in the chemical treatment for the fluids and in the production of fine particles.

Further, the desksize chemical plant of the present invention comprises a distributor for supplying a fluid to a plurality of the fine channel devices, and comprises a collector for recovering products produced by performing a chemical treatment or particles produced in the fine channel devices, whereby it is possible to simplify the structure of the piping arrangement for supplying raw material to the fine channel devices, for chemical treatment for the fluid in the fine channel devices or for producing fine particles.

Further, desksize chemical plant of the present invention comprises means for adjusting the fluid pressure produced in the fine channel device, whereby it becomes possible to feed a fluid into the fine channel device more uniformly.

The desksize chemical plant of the present invention comprises a mechanism capable of flowing a cleaning liquid in the regular or the reverse direction with respect to the direction into which the raw material fluid is flown as means for cleaning fine channels constituting the fine channel devices, whereby it becomes possible to repeat flowing of the cleaning liquid in the regular and reverse directions to increase the effect of cleaning.

The desksize chemical plant of the present invention comprises means for supplying a gas to the fine channel devices, whereby inside of the fine channels can be dried and maintained to be a clean state.

The desksize chemical plant of the present invention comprises a raw material tank for storing a raw material fluid to be supplied to the fine channel device, and a recovering tank for recovering a product produced by performing a chemical treatment to the fluid or particles produced in the fine channel device. The desksize chemical plant further comprises means for automatically supplying the raw material fluid to the raw material tank, and means for automatically feeding from the recovering tank the product produced by performing the fluid or particles produced in the fine channel device, whereby long time continuous production becomes possible regardless of the quantity stored in the raw material tank or in the recovering tank.

Further, the desksize chemical plant of the present invention comprises a tank for temporarily storing the raw material discharged from the fine channels other than the products in order to reuse at least one of the raw materials for performing the chemical treatment or for producing the fine particles, and means for recovering the raw materials to be reused from the above tank to the tank for storing the raw material. The desksize chemical plant further comprises means for separating only the raw material to be reused from the raw material containing other raw materials and/or products of the chemical treatment or the fine particles produced, whereby, for example, it becomes possible to reuse a very expensive catalyst used for heterogeneous type catalyst reaction as a chemical treatment to reduce the cost and the environmental impact.

Further, the desksize chemical plant of the present invention comprises means capable of controlling the temperature of the raw material tank, the recovering tank and the fine channel device, whereby it is possible to supply the raw material fluid stably, and to produce and store the products produced by a chemical treatment or particles produced in the fine channel device.

The desksize chemical plant of the present invention comprises a plurality of valves for every block of the fine channel devices and for every fluid to be supplied, for adjusting the quantity of the fluid supplied when the fluid is supplied to the fine channel device, whereby it becomes possible to adjust the supply rate of the raw material for each block of the fine channel devices and for each fluid to be supplied by controlling the plurality of valves, whereby it becomes possible to relatively freely control the conditions of the chemical treatment or the conditions for producing fine particles performed in the plurality of fine channels constituting the fine channel devices, and to finely control the flow rate.

The desksize chemical plant of the present invention further comprises automatically controllable means used in at lest one process selected from the group consisting of supplying fluid to the fine channel device, recovering products produced by the chemical treatment or fine particles produced in the fine channel device, washing the fine channel device and the drying the fine channel device, whereby there is no troublesome operation required.

Effect of the Fine Particle Producing Apparatus

The fine particle producing apparatus of the present invention is the desksize chemical plant comprising means for supplying at least one fluid for producing fine particles to a fine channel device and means for recovering the fine particles produced in the fine channel device, wherein the fluids for producing fine particles are a liquid containing a raw material for producing gel, and a liquid containing a dispersing agent for producing gel. By such a construction, the desksize chemical plant of the present invention can be used as a particle producing apparatus for producing gel.

Further, the fine particle producing apparatus of the present invention comprises a Y-shaped fine channel constituting a fine channel device so that a dispersion phase and a continuous phase introduced from the respective inlet ports of the fine channel device are confluented in the fine channel to produce fine particles, wherein the angle at which the channel for introducing the dispersion phase crosses the channel for introducing the continuous phase is adjusted to control the size of fine particles produced, whereby it becomes possible to produce particles of very uniform particle size having a distribution of particles of at most 10% in a large quantity and stably.

Therefore, by employing the fine particle producing apparatus of the present invention, no classification process is required for separating particles having much different particle sizes after producing the particles, whereby it becomes possible to realize a desk size gel-producing apparatus for mass production comparable to a conventional gel production plant of building size, which is of a small to medium scale, and requiring no classification process.

TABLE 1

Average particle size and distribution of produced particles

| | Average particle size (μm) | Distribution (%) |
|---|---|---|
| Fine channel device 1 | 83.8 | 9.8 |
| Fine channel device 2 | 85.2 | 9.2 |
| Fine channel device 3 | 96.1 | 7.7 |
| Fine channel device 4 | 86.8 | 9.9 |
| Fine channel device 5 | 89.9 | 9.4 |
| All fine channel devices (Fine particle producing apparatus) | 85.5 | 9.7 |

The invention claimed is:

1. A fine channel device, comprising:
   at least one fine channel substrate including,
      at least one fine channel configured to perform a chemical treatment of a fluid or to produce fine particles from the fluid,
      first and second inlet ports configured to supply at least one fluid to the at least one fine channel, and
      at least one fluid outlet port communicating with the first and second inlet ports and configured to discharge the at least one fluid applied with the chemical treatment or the at least one fluid containing the fine particles;
   a first fluid supply device including,
      at least one first opening configured to introduce the at least one fluid into a first storage space for storing the at least one fluid,
      at least one supply channel formed in a radial direction, the at least one supply channel communicating with the first inlet port to supply the at least one fluid from the first storage space to the first inlet port of the at least one fine channel substrate, and
      a second opening communicating with the at least one fluid outlet port of the at least one fine channel substrate to discharge the at least one fluid from the at least one fine channel; and
   a second fluid supply device including,
      at least one first opening for introducing a second fluid into a second storage space, and
      at least one supply channel formed in a radial direction and communicating the second inlet port to the second storage space.

2. The fine channel device according to claim 1, wherein at least one introduced fluid can be introduced from the first storage space of the first fluid supply device independently into the first fluid inlet port of the fine channel substrate having the fine channel and the first and second fluid supply devices sandwich the at least one fine channel substrate.

3. The fine channel device according to claim 2, wherein the supply channels of the first and second fluid supply devices are disposed so as not to overlap with each other.

4. The fine channel device according to any one of claims 1 to 3, further comprising:
   piling-up at least two fine channel substrates each having a fine channel for performing a chemical treatment or producing fine particles from a fluid, wherein the first fluid inlet ports for each fine channel substrate communicate with the at least one supply channel of the first fluid supply device.

5. The fine channel device according to any one of claims 1 to 3, wherein the shape of the first storage space is a circular recess.

6. The fine channel device according to any one of claims 1 to 3, wherein the shape of the first storage space is a polygonal recess.

7. A desksize chemical plant, comprising:
   a plurality of fine channel devices each fine channel device including at least one fine channel substrate including,
      at least one fine channel configured to perform a chemical treatment of a fluid or to produce fine particles from the fluid,
      first and second inlet ports configured to supply at least one fluid to the at least one fine channel, and
      at least one fluid outlet port communicating with the first and second inlet ports and configured to discharge the at least one fluid applied with the chemical treatment or the at least one fluid containing the fine particles;
   a first fluid supply device including,
      at least one first opening configured to introduce the at least one fluid into a first storage space for storing the at least one fluid,
      at least one supply channel formed in a radial direction, the at least one supply channel communicating with the first inlet port to supply the at least one fluid from the first storage space to the first inlet port of the at least one fine channel substrate, and
      a second opening communicating with the at least one fluid outlet port of the at least one fine channel substrate to discharge the at least one fluid from the at least one fine channel;
   a second fluid supply device including,
      at least one first opening for introducing a second fluid into a second storage space, and
      at least one supply channel formed in a radial direction and communicating the second inlet port to the second storage space;
   a supply mechanism configured to supply at least one fluid to the plurality of fine channel devices; and
   a recovery mechanism configured to recover products produced by the chemical treatment for the fluid or fine particles formed from the fluid.

8. The desksize chemical plant according to claim 7, wherein the supply mechanism is of a pressure-driven type, and the desksize chemical plant further comprises a degassing mechanism configured to degas liquid to be supplied to the fine channel device.

9. The desksize chemical plant according to claim 7 or 8, further comprising:
   a distributor configured to supply the fluid to the fine channel device; and
   a collector configured to recover the fine particles formed in the fine channel device.

10. The desksize chemical plant according to any one of claims 7 to 8, further comprising:
   an adjusting mechanism configured to adjust the fluid pressure produced in the fine channel device.

11. The desksize chemical plant according to any one of claims 7 to 8, further comprising:
   a flow mechanism configured to circulate fluid in the regular or the reverse direction to clean the fine channel device.

12. The desksize chemical plant according to any one of claims 7 to 8, further comprising:
a drying mechanism configured to supply a gas for drying the fine channels.

13. The desksize chemical plant according to any one of claims 7 to 8, further comprising:
an automatic supply mechanism configured to supply raw materials for performing a chemical treatment or for producing fine particles to tanks for storing them; and
an automatic feed mechanism configured to feed products produced by the chemical treatment or fine particles produced from tanks for recovering them.

14. The desksize chemical plant according to any one of claims 7 to 8, further comprising:
a first tank configured to temporarily store the raw material discharged from the fine channels other than the products in order to reuse at least one of the raw materials for performing the chemical treatment or for producing the fine particles; and
a raw material recovery mechanism configured to recover the raw materials to be reused from the first tank to a second tank for storing the raw material.

15. The desksize chemical plant according to any one of claims 7 to 8, further comprising:
a separating mechanism configured to separate only the raw material to be reused from the raw material containing other raw materials and/or products of the chemical treatment or the fine particles produced.

16. The desksize chemical plant according to any one of claims 7 to 8, further comprising:
a storage tank configured to store fluid to be supplied to the fine channel device;
a recovery tank configured to recover products produced by performing the chemical treatment or fine particles produced; and
a control mechanism configured to control the temperature of the storage and recovery tanks and the fine channel device.

17. The desksize chemical plant according to any one of claims 7 to 8, further comprising:
a plurality of valves configured to adjust the quantity of the fluid supplied when the fluid is supplied to the fine channel device to be a predetermined supply rate.

18. The desksize chemical plant according to any one of claims 7 to 8, further comprising:
an automatic control mechanism configured to be used in at least one of supplying fluid to the fine channel device, recovering products produced by the chemical treatment or fine particles produced in the fine channel device, washing the fine channel device and drying the fine channel device.

19. A desksize chemical plant fine particle producing apparatus comprising:
a plurality of fine channel devices each fine channel device including at least one fine channel substrate including,
at least one fine channel configured to perform a chemical treatment of a fluid or to produce fine particles from the fluid,
first and second inlet ports configured to supply at least one fluid to the at least one fine channel, and
at least one fluid outlet port communicating with the first and second inlet ports and configured to discharge the at least one fluid applied with the chemical treatment or the at least one fluid containing the fine particles;
a first fluid supply device including,
a first opening configured to introduce the at least one fluid into a first storage space for storing the at least one fluid,
at least one supply channel formed in a radial direction, the at least one supply channel communicating with the first inlet port to supply the at least one fluid from the first storage space to the first inlet port of the at least one fine channel substrate, and
a second opening communicating with the at least one fluid outlet port of the at least one fine channel substrate to discharge the at least one fluid from the at least one fine channel;
a second fluid supply device including,
at least one first opening for introducing a second fluid into a second storage space, and
at least one supply channel formed in a radial direction and communicating the second inlet port to the second storage space;
a supply mechanism configured to supply at least one fluid for producing the fine particles to the plurality of fine channel devices; and
a fine particle recovering mechanism configured to recover the fine particles produced in the fine channel device.

20. The fine particle producing apparatus according to claim 19, wherein the fluids for producing fine particles comprises a liquid containing a raw material for producing gel, and a liquid containing a dispersing agent for producing gel.

21. The fine particle producing apparatus according to claim 19 or 20, wherein the at least one fine channel has a Y-shape so that a dispersion phase and a continuous phase introduced from respective inlet ports of the fine channel substrate are confluented in the fine channel to produce fine particles.

22. The fine particle producing apparatus according to claim 21, wherein the angle at which the channel for introducing the dispersion phase crosses the channel for introducing the continuous phase is adjusted to control the size of fine particles produced.

* * * * *